United States Patent
Kobayashi

(10) Patent No.: US 7,440,196 B2
(45) Date of Patent: Oct. 21, 2008

(54) IMAGE FORMING OPTICAL SYSTEM AND IMAGE PICKUP APPARATUS USING THE SAME

(75) Inventor: Satomi Kobayashi, Tokyo (JP)

(73) Assignee: Olympus Imaging Corp., Tokyo (JP)

(*) Notice: Subject to any disclaimer, the term of this patent is extended or adjusted under 35 U.S.C. 154(b) by 226 days.

(21) Appl. No.: 11/520,988

(22) Filed: Sep. 14, 2006

(65) Prior Publication Data
US 2007/0064315 A1   Mar. 22, 2007

(30) Foreign Application Priority Data
Sep. 16, 2005   (JP) .............................. 2005-269506

(51) Int. Cl.
G02B 15/14   (2006.01)
(52) U.S. Cl. ...................... 359/691; 359/714
(58) Field of Classification Search ............... 359/691, 359/714, 740, 761–770, 793, 794
See application file for complete search history.

(56) References Cited

U.S. PATENT DOCUMENTS

| 4,660,940 A | 4/1987 | Ogawa et al. |
| 5,706,141 A | 1/1998 | Abe |
| 6,222,685 B1 | 4/2001 | Yamada |
| 6,665,131 B2* | 12/2003 | Suzuki et al. ............... 359/778 |

FOREIGN PATENT DOCUMENTS

| JP | 02-081018 | 3/1990 |
| JP | 05-210047 | 2/1993 |
| JP | 09-166748 | 6/1997 |
| JP | 09-297264 | 11/1997 |
| JP | 10-293246 | 11/1998 |
| JP | 2001-021800 | 1/2001 |
| JP | 2001-056434 | 2/2001 |
| JP | 2003-140039 | 5/2003 |
| JP | 2005-024969 | 1/2005 |

* cited by examiner

Primary Examiner—Hung X Dang
(74) Attorney, Agent, or Firm—Kenyon & Kenyon LLP

(57) ABSTRACT

An image forming optical system comprising: a first positive lens unit disposed closest to the object side in the image forming optical system; an aperture stop; and a second positive lens unit disposed closest to an image side in the image forming optical system,
the second lens unit comprising: a front lens unit whose surface closest to the image side is a concave surface which faces the image side; and a rear lens unit consisting of one positive meniscus lens whose convex surface faces the image side,
the image forming optical system satisfying the following conditions:

$-1.0 < R2/R3 < -0.01$; and   (1)

$0.3 < \Sigma D2G/FL < 1.2$.   (2)

24 Claims, 13 Drawing Sheets

IMAGE FORMING OPTICAL SYSTEM AND IMAGE PICKUP APPARATUS USING THE SAME

CROSS REFERENCE TO RELATED APPLICATION

This application claims benefit under 35 U.S.C. § 119 of Japanese Patent Applications of No. 2005-269,506 filed in Japan on Sep. 16, 2005, the contents of which are incorporated herein by reference.

BACKGROUND OF THE INVENTION

1. Field of the Invention

The present invention relates to an image forming optical system and an image pickup apparatus including the system.

2. Description of the Related Art

In the recently prevalent image pickup apparatus such as a compact digital camera or a cellular phone equipped with a camera, there is used an electronic image sensor such as a CCD image sensor or a CMOS type image sensor.

Such an electronic image sensor has a characteristic that adequate color cannot be reproduced, when the incidence angle of ray upon the image sensor is large.

Therefore, in an image forming optical system for use in the above image pickup apparatus, the exit pupil is positioned far from the image pickup surface of the electronic image sensor to thereby reduce the incidence angle of ray to be incident on the image sensor.

As such an image forming optical system for use in the image pickup apparatus, there are known image forming optical systems described in, for example, the following documents (1) to (9):

(1) Japanese Patent Application Laid-Open No. 2005-24969;

(2) Japanese Patent Application Laid-Open No. 2003-140039;

(3) Japanese Patent Application Laid-Open No. 2001-56434;

(4) Japanese Patent Application Laid-Open No. 2001-21800;

(5) Japanese Patent Application Laid-Open No. 2000-105334;

(6) Japanese Patent Application Laid-Open No. 10-293246;

(7) Japanese Patent Application Laid-Open No. 09-297264;

(8) Japanese Patent Application Laid-Open No. 09-189856; and (9) Japanese Patent Application Laid-Open No. 09-166748.

BRIEF SUMMARY OF THE INVENTION

In one aspect, an image forming optical system of the present invention comprises, in order from an object side: a first lens unit having a positive refractive power; an aperture stop; and a second lens unit having a positive refractive power, the first lens unit being a lens unit which is closest to the object side in the image forming optical system;

the second lens unit being a lens unit which is closest to an image side in the image forming optical system, the second lens unit comprising, in order from the object side:

a front lens unit in which a surface closest to the image side is a concave surface which faces the image side; and a rear lens unit which has a positive refractive power and in which a surface closest to the object side is a concave surface which faces the object side, the rear lens unit consisting of one positive meniscus lens whose convex surface faces the image side, the image forming optical system satisfying following conditions (1) and (2):

$$-1.0 < R2/R3 < -0.01 \quad (1); \text{ and}$$

$$0.3 < \Sigma D2G/FL < 1.2 \quad (2),$$

wherein R2 denotes a paraxial radius of curvature of the surface of the front lens unit closest to the image side, R3 denotes a paraxial radius of curvature of the surface of the rear lens unit closest to the object side, $\Sigma D2G$ denotes an axial length from the surface closest to the object side to the surface closest to the image side in the second lens unit, and FL denotes a focal length of the whole image forming optical system.

Moreover, in another aspect, an image forming optical system of the present invention comprises, in order from an object side: a first lens unit having a positive refractive power; an aperture stop; and a second lens unit having a positive refractive power, the first lens unit being a lens unit which is closest to the object side in the image forming optical system;

the second lens unit being a lens unit which is closest to an image side in the image forming optical system, the second lens unit comprising, in order from the object side:

a front lens unit in which a surface closest to the image side is a concave surface which faces the image side; and a rear lens unit which has a positive refractive power and in which a surface closest to the object side is a concave surface which faces the object side, the rear lens unit consisting of one positive meniscus lens whose convex surface faces the image side, at least one optical element of the optical system having a refractive index which is larger than 1.9, the following condition (1) being satisfied:

$$-1.0 < R2/R3 < -0.01 \quad (1),$$

wherein R2 denotes a paraxial radius of curvature of the surface of the front lens unit closest to the image side, and R3 denotes a paraxial radius of curvature of the surface of the rear lens unit on the object side.

In the image forming optical system of the present invention, it is preferable that the front lens unit has a negative refractive power.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
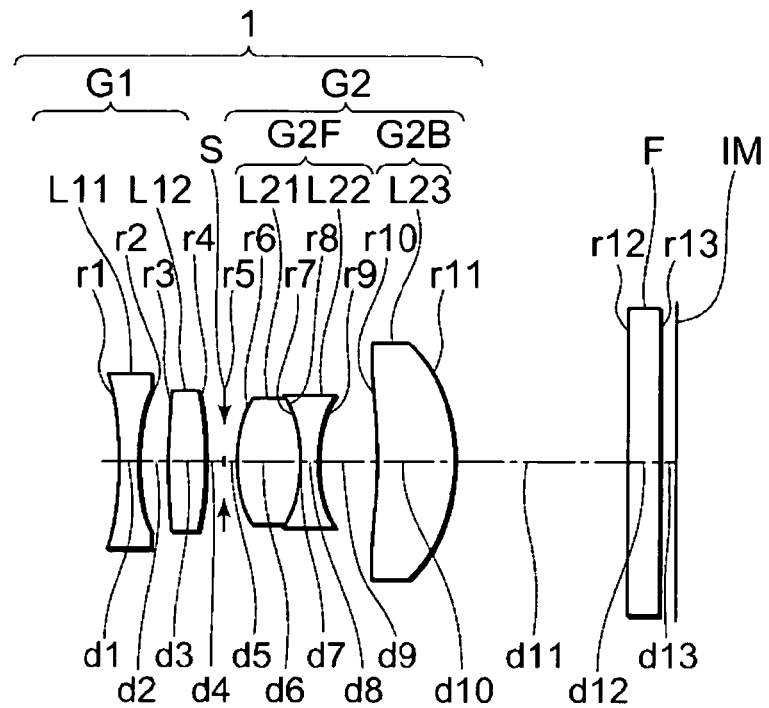
FIG. 1 is a sectional view along an optical axis of Example 1 of an image forming optical system of the present invention.

As described above, in one aspect, the image forming optical system of the present invention comprises, in order from an object side: a first lens unit having a positive refractive power; an aperture stop; and a second lens unit having a positive refractive power, the first lens unit being a lens unit which is closest to the object side in the image forming optical system;

the second lens unit being a lens unit which is closest to an image side in the image forming optical system, the second lens unit comprising, in order from the object side:

a front lens unit in which a surface closest to the image side is a concave surface which faces the image side; and a rear lens unit which has a positive refractive power and in which a surface closest to the object side is a concave surface which faces the object side, the rear lens unit consisting of one positive meniscus lens whose convex surface faces the image side, the image forming optical system satisfying the following conditions (1) and (2):

$$-1.0 < R2/R3 < -0.01 \quad (1); \text{ and}$$

$$0.3 < \Sigma D2G/FL < 1.2 \quad (2),$$

wherein R2 denotes a paraxial radius of curvature of the surface of the front lens unit closest to the image side, R3 denotes a paraxial radius of curvature of the object-side surface of the rear lens unit, ΣD2G denotes an axial length from the surface closest to the object side to the surface closest to the image side in the second lens unit, and FL denotes a focal length of the image forming optical system.

In the above image forming optical system, since the refractive power of the first lens unit on the object side has the same sign as the refractive power of the second lens unit on the image side with the aperture stop being held between the first lens unit and the second lens unit, distortion and the like are easily corrected.

Moreover, when the second lens unit is divided into the front lens unit and the rear lens unit having the positive refractive power, the rear lens unit is separated from the aperture stop. Therefore, it is possible to obtain an optical system which is advantageous in keeping the exit pupil distant from the image surface.

Furthermore, in a case where the rear lens unit of the second lens unit is constituted of the positive meniscus lens whose convex surface faces the image side, the surface of the image forming optical system closest to the image side can be constituted as a convex surface having a large curvature. Therefore, it is possible to obtain an optical system which is advantageous in keeping the exit pupil farther away from the image surface. Also the principal point of the rear lens unit of the second lens unit is brought close to the image side, and the thickness of the image forming optical system can be reduced. Further, an off-axial light flux is gradually refracted by the incidence surface and the exit surface, and it is possible to reduce generation of off-axial aberration which is easily generated in the rear lens unit of the second lens unit.

The condition (1) is a condition to define the shape of the air lens which is held between the front lens unit and the rear lens unit of the second lens unit and whose convex surface faces the opposite sides. This condition contributes to a case where there are simultaneously satisfied miniaturization of the image forming optical system and achievement of a satisfactory balance between correction of axial aberration and correction of off-axial aberration.

The above image forming optical system imparts the negative refractive power to this air lens to generate positive spherical aberration, and this positive spherical aberration contributes to offsetting and reducing of spherical aberration of the image forming optical system as a whole.

Above the upper limit of the condition (1), the absolute value of the radius of curvature of the object-side surface of the air lens having the negative refractive power becomes excessively small, and it becomes difficult to suppress off-axial aberration generated in this surface.

On the other hand, below the lower limit of the condition (1), the absolute value of the radius of curvature of the image-side surface of the air lens becomes excessively small. Therefore, the rear lens unit is easily separated from the front lens unit, and the thickness of the image forming optical system easily increases.

Moreover, in a case where the thickness of the air lens is forcibly reduced, when the front lens unit of the second lens unit is constituted to have the negative refractive power, the height of the incident ray on the rear lens unit of the second lens unit lowers. Therefore, the positive refractive power of the rear lens unit of the second lens unit needs to be strengthened, and it becomes difficult to correct off-axial aberration in the rear lens unit of the second lens unit.

The condition (2) is a condition which defines the thickness of the second lens unit.

Above the upper limit of the condition (2), the rear lens unit comes excessively close to the image surface. Therefore, it becomes difficult to secure a space in which a filter and the like are to be inserted. Also, the incidence height of the off-axial ray increases, and the outer diameter of the rear lens unit increases. Further, the thickness of the image pickup apparatus in the state that the lens barrel is collapsed increases. To reduce the thickness of the image pickup apparatus in the state that the lens barrel is collapsed, the number of the lens barrels included in a collapsible type lens barrel increases, and the mechanical constitution is complicated.

On the other hand, below the lower limit of the condition (2), the system becomes advantageous for miniaturization in thickness. If the exit pupil is kept away from the image surface, however, it is necessary to enhance both of the function diverging the off-axial ray by the front lens unit of the second lens unit and the refractive power for bending the diverged off-axial ray for reducing the diverging angle thereof by the rear lens unit of the second lens unit. It becomes difficult to correct miscellaneous aberrations.

Next, in another aspect, the image forming optical system of the present invention comprises, in order from an object side: a first lens unit having a positive refractive power; an aperture stop; and a second lens unit having a positive refractive power, the first lens unit being a lens unit which is closest to the object side in the image forming optical system;

the second lens unit being a lens unit which is closest to an image side in the image forming optical system, the second lens unit comprising, in order from the object side:

a front lens unit in which a surface closest to the image side is a concave surface which faces the image side; and a rear lens unit which has a positive refractive power and in which a surface closest to the object side is a concave surface which faces the object side, the rear lens unit consisting of one positive meniscus lens whose convex surface faces the image side, at least one optical element of the optical system having a refractive index which is larger than 1.9, the image forming optical system satisfying the following condition (1):

$$-1.0 < R2/R3 < -0.01 \quad (1),$$

wherein R2 denotes a paraxial radius of curvature of the surface of the front lens unit closest to the image side, and R3 denotes a paraxial radius of curvature of the surface of the rear lens unit on the object side.

Also in this image forming optical system, since the refractive power of the first lens unit on the object side has the same sign as the refractive power of the second lens unit on the image side with the aperture stop being held between the first lens unit and the second lens unit, distortion and the like are easily corrected.

Moreover, when the second lens unit is divided into the front lens unit and the rear lens unit having the positive refractive power, the rear lens unit having the positive refractive power is separated from the aperture stop. Therefore, it is possible to obtain an optical system which is advantageous in keeping the exit pupil away from the image surface.

Furthermore, in a case where the rear lens unit of the second lens unit is constituted of the positive meniscus lens whose convex surface faces the image side, the surface of the image forming optical system closest to the image side can be constituted as a convex surface having a large curvature. Therefore, an optical system is obtained that is advantageous in keeping the exit pupil further away from the image surface. Also, the principal point of the rear lens unit of the second lens unit is brought close to the image side, and the thickness of the image forming optical system can be reduced. Further, the off-axial light flux is gradually refracted by the incidence surface and the exit surface, and it is possible to reduce generation of off-axial aberration which is easily generated in the rear lens unit of the second lens unit.

The condition (1) is a condition to define the shape of the air lens which is held between the front lens unit and the rear lens unit of the second lens unit and whose convex surface faces the opposite sides. This condition contributes to a case where there are simultaneously satisfied miniaturization of the image forming optical system and achievement of a satisfactory balance between correction of axial aberration and correction of off-axial aberration.

When a negative refractive power is imparted to this air lens to generate positive spherical aberration, the spherical aberration of the image forming optical system is offset and reduced.

Above the upper limit of the condition (1), the absolute value of the radius of curvature of the object-side surface of the air lens having the negative refractive power becomes excessively small, and it becomes difficult to suppress the off-axial aberration generated in this surface.

On the other hand, below the lower limit of the condition (1), the absolute value of the radius of curvature of the image-side surface of the air lens becomes excessively small. Therefore, the rear lens unit is easily separated from the front lens unit, and the thickness of the image forming optical system easily increases.

Moreover, in a case where the thickness of the air lens is forcibly reduced, when the front lens unit is constituted to have the negative refractive power, the height of the incident ray on the rear lens unit of the second lens unit lowers. Therefore, the positive refractive power of the rear lens unit of the second lens unit needs to be strengthened, and it becomes difficult to correct the off-axial aberration in the rear lens unit of the second lens unit.

However, concerning the refractive index of the optical element constituting the image forming optical system, when the refractive index of at least one optical element is set to be above 1.9, the position of the principal points is appropriately set, and the thickness of the image forming optical system is easily reduced. When the curvature of this optical element is reduced, the generation of aberration can be reduced.

Especially, when the refractive index of a double-convex lens is set to be larger than 1.9, the curvature of the lens surface can be reduced while maintaining the refractive power. This is preferable in view of aberration correction of the image forming optical system.

In each of the above image forming optical systems, it is preferable that the front lens unit has a negative refractive power.

In the positive-negative-positive refractive power arrangement from the object side, the Petzval sum is easily corrected, and various aberrations can be corrected with a good balance.

Furthermore, in each of the above image forming optical systems, it is preferable to satisfy the following condition (3):

$$n1 > 1.9 \quad (3),$$

wherein n1 denotes the refractive index of the lens of the first lens unit closest to the image side.

The condition (3) is a condition which defines the refractive index of the lens of the first lens unit closest to the image side.

Below the lower limit of the condition (3), the curvature needs to be increased in order to secure the refractive power of the lens of the first lens unit closest to the image side, and therefore it generally becomes difficult to correct aberration. It also becomes difficult to correct chromatic aberration.

Furthermore, in each of the above image forming optical systems, it is preferable that the first lens unit has a negative lens and a positive lens in order from the object side, and the front lens unit of the second lens unit has a positive lens and a negative lens in order from the object side.

According to such a constitution, a roughly symmetric lens arrangement is realized with the first lens unit and the front lens unit of the second lens unit, and this arrangement is advantageous for reduction of aberration.

Moreover, when the image forming optical system includes the negative lens, axial chromatic aberration is easily reduced.

Furthermore, in each of the above image forming optical systems, it is preferable to satisfy the following condition (4):

$$-1.2 < FL/fG2F < 0.5 \quad (4),$$

wherein fG2F denotes a focal length of the front lens unit of the second lens unit.

The condition (4) is a condition which defines the refractive power of the front lens unit of the second lens unit.

Below the lower limit of the condition (4), the negative refractive power of the front lens unit of the second lens unit becomes excessively strong. Therefore, the off-axial luminous flux largely diverges, and it becomes difficult to correct off-axial aberration such as coma.

On the other hand, above the upper limit of the condition (4), the positive refractive power of the front lens unit of the second lens unit becomes excessively strong, and it therefore becomes difficult to correct astigmatism.

Furthermore, in each of the above image forming optical systems, when the first lens unit has a negative lens and a positive lens in order from the object side, it is preferable to satisfy the following condition:

$$0.4 < \Sigma d/TL < 0.8 \quad (5),$$

wherein $\Sigma d$ denotes an axial length from the surface of the first lens unit closest to the object side to the surface of the second lens unit closest to the image side, and TL denotes a sum of the axial length $\Sigma d$ and a back focus of the image forming optical system. Here the back focus is a distance between the rearmost surface of the image forming optical system and the image surface.

When the first lens unit is constituted in this manner, the first lens unit may have a function like a wide conversion lens, and this is advantageous in securing an angle of field.

On the other hand, when the first lens unit is constituted in this manner, the negative lens is disposed closest to the object side of the image forming optical system, and the positive lens is disposed closest to the image side of the image forming optical system. Therefore, the incidence height of a chief ray reaching the maximum image height on the image surface increases on the negative lens which is distant from an aperture stop and which is closest to the object side, and the incidence height of a chief ray reaching the maximum image height on the image surface also increases on the positive lens positioned closest to the image side. As a result, the off-axial ray is largely refracted on this lens, and off-axial aberration such as a barrel type distortion is easily generated.

Especially, when the axial length $\Sigma d$ is large with respect to the sum TL of the axial length $\Sigma d$ from the surface of the first lens unit closest to the object side to the surface of the second lens unit closest to the image side and the back focus of the image forming optical system, there increases the incidence height of the off-axial ray incident on the lens which is distant from the aperture stop and closest to the image side, and off-axial aberration is easily generated.

Therefore, it is preferable that in order to correct the off-axial aberration, the thickness of the image forming optical system is appropriately reduced to adjust the incidence height of the off-axial light flux.

The condition (5) is a condition which defines the thickness of the image forming optical system.

If the image forming optical system becomes thick above the upper limit of the condition (5), the incidence height of the off-axial ray increases, and it becomes difficult to correct off-axial aberration and miniaturize the image forming optical system.

On the other hand, if the image forming optical system becomes thin below the lower limit of the condition (5), astigmatism is well corrected, but an off-axial chief ray is easily refracted largely on each surface, and it becomes difficult to correct the whole aberration balance.

Furthermore, in each of the above image forming optical systems, it is preferable to satisfy the following condition (6):

$$0.0 \leq dS/TL < 0.2 \quad (6),$$

wherein TL denotes the sum of the axial length from the surface of the first lens unit closest to the object side to the surface of the second lens unit closest to the image side and the back focus of the image forming optical system, and dS denotes an axial length between the surface of the first lens unit closest to the image side and the surface of the second lens unit closest to the object side.

The condition (6) is a condition which defines an air space where an aperture stop is disposed.

Above the upper limit of the condition (6), the distance from the aperture stop to the optical element before or after the aperture stop becomes excessively long, and the first lens unit is excessively separated from the second lens unit. Therefore, it becomes difficult to correct spherical aberration or sagittal coma.

The lower limit of the condition (6) does not turn to a negative value below 0.0.

It is to be noted that the lower limit of the condition (6) may be set to 0.01.

Below this lower limit of 0.01, during manufacturing, it becomes difficult to dispose the aperture stop having a variable aperture diameter between the first lens unit and the second lens unit.

Furthermore, in each of the above image forming optical systems, it is preferable that the rear lens unit of the second lens unit has an aspherical surface.

When the overall curvature of the rear lens unit of the second lens unit is increased, the principal point of the second lens unit can be disposed close to the image side, and this arrangement can contribute to reduction of the length Σd of the image forming optical system. At this time, if the rear lens unit of the second lens unit has an aspherical surface while satisfying the above condition (1), the paraxial radius of curvature can be increased. Moreover, it is possible to suppress the generation of off-axial aberration.

Moreover, in the above image forming optical systems, it is preferable that the second lens unit has an aspherical surface on the object-side surface of the rear lens unit of the second lens unit.

Especially, since the object-side surface of the rear lens unit is a gentle surface having a large paraxial radius of curvature. Therefore, when this surface is constituted of an aspherical surface, it becomes easy to work the aspherical surface to be disposed in the second lens unit. In a case where the aspherical surface is disposed in the surface, since the surface is close to the image-side surface of the front lens unit of the second lens unit, aberration of the off-axial light flux which has been diverged by the front lens unit is advantageously reduced.

Furthermore, in each of the above image forming optical systems, it is preferable that the first lens unit consists of, in order from the object side, a negative lens whose concave surface faces the object side, and a positive lens whose convex surface faces the image side, and the front lens unit of the second lens unit consists of, in order from the object side, a positive lens whose convex surface faces the object side and a negative lens whose concave surface faces the image side.

According to such a constitution, a roughly symmetric refractive power arrangement with respect to the aperture stop is realized with the first lens unit and the front lens unit of the second lens unit, and the generation of aberration is easily suppressed. When the lens of the image forming optical system closest to the object side is constituted of the negative lens whose concave surface faces the object side, the image forming optical system can be prevented from being thickened.

The above image forming optical system can be used in an electronic image pickup apparatus, more particularly an image pickup apparatus using an electronic image sensor such as a CCD image sensor or a CMOS type image sensor which converts an optical image into an electric signal.

The image pickup apparatus including the image forming optical system of the present invention comprises: either of the above image forming optical systems; and an electronic image sensor disposed on the image side of the image forming optical system, the image sensor being configured to convert an optical image formed by the image forming optical system into an electric signal.

In each of the above image forming optical systems, it is easy to set the position of the exit pupil far from the image surface. Therefore, the system is suitable as an image forming optical system of the image pickup apparatus including the electronic image sensor.

Moreover, in the image pickup apparatus including the above image forming optical system, it is preferable to dispose a low-pass filter on the optical axis between the image forming optical system and the electronic image sensor.

In a case where the electronic image sensor is used in the image pickup apparatus, when an image of an object having a high spatial frequency component is picked up, Moire patterns are easily generated. Therefore, when the low-pass filter is disposed in the image-side space of the above image forming optical system, the Moire patterns due to the high spatial frequency component can preferably be reduced.

Each of the above conditions can be modified as follows.

It is more preferable to set the upper limit of the condition (1) to −0.05, further −0.08. It is more preferable to set the lower limit of the condition (1) to −0.7, further −0.4.

It is more preferable to set the upper limit of the condition (2) to 1.1, further 1.0. It is more preferable to set the lower limit of the condition (2) to 0.5, further 0.6.

It is more preferable to set the upper limit of the condition (3) to 2.5, further 2.3, because an optical material can be inexpensive. It is more preferable to set the lower limit of the condition (3) to 1.95, further 2.0.

When the upper limit of the condition (4) is set to 0.35, further −0.05, the astigmatism is advantageously corrected. When the lower limit of the condition (4) is set to −1.1, further −0.6, the coma is advantageously corrected.

It is more preferable to set the upper limit of the condition (5) to 0.75, further 0.70. It is more preferable to set the lower limit of the condition (5) to 0.45, further 0.50.

It is more preferable to set the upper limit of the condition (6) to 0.15, further 0.07. It is more preferable to set the lower limit of the condition (6) to 0.01, further 0.015.

Next, numerical examples of the present invention will be described with reference to the drawings.

EXAMPLE 1

Figure 2:
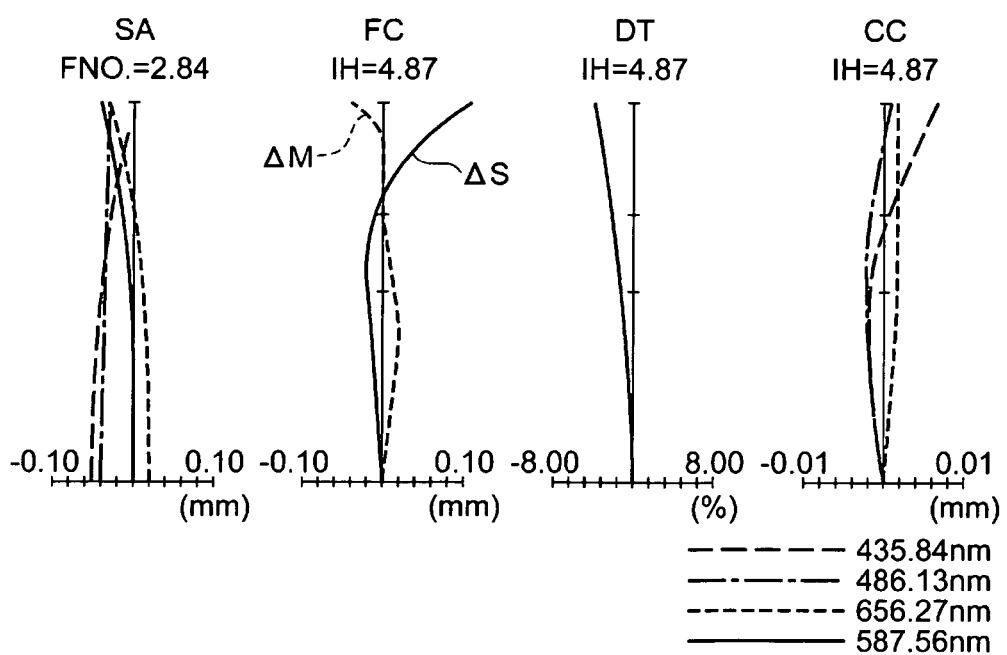
FIG. 2 is a graph showing spherical aberration, astigmatism, distortion and chromatic aberration of magnification of Example 1.

FIG. 1 is a sectional view along an optical axis of Example 1. FIG. 2 is a graph showing spherical aberration SA, astigmatism FC, distortion DT and chromatic aberration CC of magnification of Example 1. It is to be noted that in FIG. 2, IH denotes an image height.

An image forming optical system 1 of Example 1 is constituted of, in order from an object side, a first lens unit G1 having a positive refractive power, an aperture stop S and a second lens unit G2 having a positive refractive power. It is to be noted that in FIG. 1, F denotes a plane parallel plate such as a low-pass filter, cover glass of an electronic image sensor or an infrared cutting filter, and IM denotes a light receiving surface of the electronic image sensor.

The first lens unit G1 is constituted of, in order from the object side, a double-concave lens L11, and a double-convex lens L12.

The second lens unit G2 is constituted of, in order from the object side, a front lens unit G2F, and a rear lens unit G2B.

The front lens unit G2F is constituted of, in order from the object side, a double-convex lens L21 and a double-concave lens L22, and has a negative refractive power.

The rear lens unit G2B is constituted of one positive meniscus lens L23 whose convex surface faces the image side.

Moreover, the object-side surface of the positive meniscus lens L23 is formed into an aspherical surface.

Next, there will be described numerical data of optical members constituting the image forming optical system of Example 1. In the numerical data, $r_1, r_2 \ldots$ denote radii of curvature of the optical members, $d_1, d_2 \ldots$ denote surface spaces (thicknesses or air spaces) between the optical members, $n_{d1}, n_{d2} \ldots$ denote refractive indices of the optical members for the d-line, $v_{d1}, v_{d2} \ldots$ denote Abbe numbers of the optical members for the d-line, FL denotes the focal length of the image forming optical system, FNO. denotes the F number, and $2\omega$ denotes the angle of field. They are common to the following numerical data of examples. Symbol (AS) means that the surface is an aperture stop, and (A) means that the surface is an aspherical surface.

It is to be noted that the shape of an aspherical surface is defined by the following equation (c) in a coordinate system in which an optical axis is a Z-axis, and a direction crossing the optical axis at right angles is a Y-axis:

$$Z=(Y^2/r)/[1+\{1-(1+k)\cdot(Y/r)^2\}^{1/2}]+A_4y^4+A_6y^6+A_8y^8+A_{10}y^{10} \quad (c),$$

wherein k denotes a conic constant, and $A_4, A_6, A_8$ and $A_{10}$ are 4th-order, 6th-order, 8th-order and 10th-order aspherical coefficients.

Numerical Data 1 (Example 1)

| FL: 7.964 | FNO.: 2.84 | 2ω: 59.48° | |
|---|---|---|---|
| $r_1 = -13.342$ | $d_1 = 0.55$ | $n_{d1} = 1.51633$ | $v_{d1} = 64.14$ |
| $r_2 = 5.741$ | $d_2 = 0.99$ | | |
| $r_3 = 17.420$ | $d_3 = 1.12$ | $n_{d3} = 2.00330$ | $v_{d3} = 28.27$ |
| $r_4 = -12.422$ | $d_4 = 0.60$ | | |
| $r_5 = \infty(AS)$ | $d_5 = 0.40$ | | |
| $r_6 = 5.582$ | $d_6 = 1.95$ | $n_{d6} = 1.81600$ | $v_{d6} = 46.62$ |
| $r_7 = -4.079$ | $d_7 = 0.01$ | $n_{d7} = 1.56384$ | $v_{d7} = 60.67$ |
| $r_8 = -4.079$ | $d_8 = 0.50$ | $n_{d8} = 1.80518$ | $v_{d8} = 25.42$ |
| $r_9 = 4.079$ | $d_9 = 1.87$ | | |
| $r_{10} = -36.446(A)$ | $d_{10} = 2.40$ | $n_{d10} = 1.80610$ | $v_{d10} = 40.92$ |
| $r_{11} = -5.657$ | $d_{11} = 5.30$ | | |
| $r_{12} = \infty$ | $d_{12} = 1.00$ | $n_{d12} = 1.51633$ | $v_{d12} = 64.14$ |
| $r_{13} = \infty$ | $d_{13} = 0.50$ | | |

Aspherical Coefficient

| surface number | k | $A_4$ | $A_6$ | $A_8$ | $A_{10}$ |
|---|---|---|---|---|---|
| 10 | -0.000 | $-7.98723 \times 10^{-4}$ | $1.00069 \times 10^{-4}$ | $-8.05070 \times 10^{-6}$ | $5.36217 \times 10^{-7}$ |

EXAMPLE 2

Figure 3:
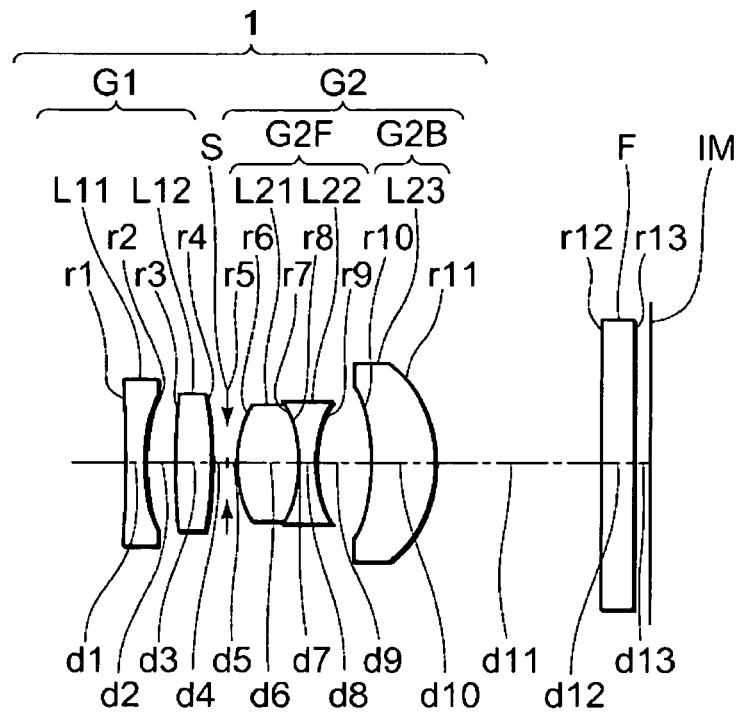
FIG. 3 is a sectional view along an optical axis of Example 2 of the image forming optical system of the present invention.
Figure 4:
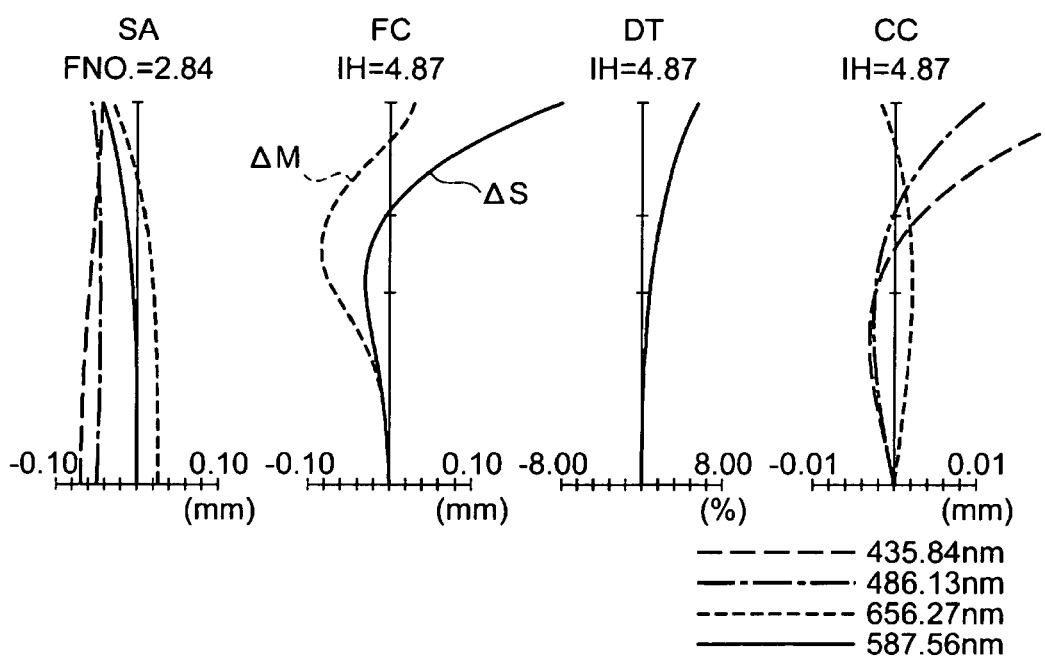
FIG. 4 is a graph showing spherical aberration, astigmatism, distortion and chromatic aberration of magnification of Example 2.

FIG. 3 is a sectional view along an optical axis of Example 2. FIG. 4 is a graph showing spherical aberration SA, astigmatism FC, distortion DT and chromatic aberration CC of magnification of Example 2. It is to be noted that in FIG. 4, IH denotes an image height.

An image forming optical system 1 of Example 2 is constituted of, in order from an object side, a first lens unit G1 having a positive refractive power, an aperture stop S and a second lens unit G2 having a positive refractive power. It is to be noted that in FIG. 3, F denotes a plane parallel plate such as a low-pass filter, cover glass of an electronic image sensor or an infrared cutting filter, and IM denotes a light receiving surface of the electronic image sensor.

The first lens unit G1 is constituted of, in order from the object side, a double-concave lens L11, and a double-convex lens L12.

The second lens unit G2 is constituted of, in order from the object side, a front lens unit G2F, and a rear lens unit G2B.

The front lens unit G2F is constituted of, in order from the object side, a double-convex lens L21 and a double-concave lens L22, and has a negative refractive power.

The rear lens unit G2B is constituted of one positive meniscus lens L23 whose convex surface faces the image side.

Moreover, the object-side surface of the positive meniscus lens L23 is formed into an aspherical surface.

Next, there will be described numerical data of optical members constituting the image forming optical system of Example 2.

Numerical Data 2 (Example 2)

| FL: 7.964 | FNO.: 2.84 | 2ω: 59.59° | |
|---|---|---|---|
| $r_1 = -20.015$ | $d_1 = 0.55$ | $n_{d1} = 1.51633$ | $v_{d1} = 64.14$ |
| $r_2 = 5.443$ | $d_2 = 0.96$ | | |
| $r_3 = 17.700$ | $d_3 = 1.16$ | $n_{d3} = 2.00330$ | $v_{d3} = 28.27$ |
| $r_4 = -12.636$ | $d_4 = 0.60$ | | |
| $r_5 = \infty(AS)$ | $d_5 = 0.40$ | | |
| $r_6 = 5.442$ | $d_6 = 1.95$ | $n_{d6} = 1.81600$ | $v_{d6} = 46.62$ |
| $r_7 = -4.066$ | $d_7 = 0.01$ | $n_{d7} = 1.56384$ | $v_{d7} = 60.67$ |
| $r_8 = -4.066$ | $d_8 = 0.50$ | $n_{d8} = 1.80518$ | $v_{d8} = 25.42$ |
| $r_9 = 4.166$ | $d_9 = 1.86$ | | |
| $r_{10} = -8.229(A)$ | $d_{10} = 2.20$ | $n_{d10} = 1.80610$ | $v_{d10} = 40.92$ |
| $r_{11} = -4.099$ | $d_{11} = 5.30$ | | |
| $r_{12} = \infty$ | $d_{12} = 1.00$ | $n_{d12} = 1.51633$ | $v_{d12} = 64.14$ |
| $r_{13} = \infty$ | $d_{13} = 0.50$ | | |

Aspherical Coefficient

| surface number | k | $A_4$ | $A_6$ | $A_8$ | $A_{10}$ |
|---|---|---|---|---|---|
| 10 | -0.074 | $-2.79189 \times 10^{-3}$ | $8.30840 \times 10^{-5}$ | $-3.24760 \times 10^{-5}$ | $2.88031 \times 10^{-6}$ |

EXAMPLE 3

Figure 5:
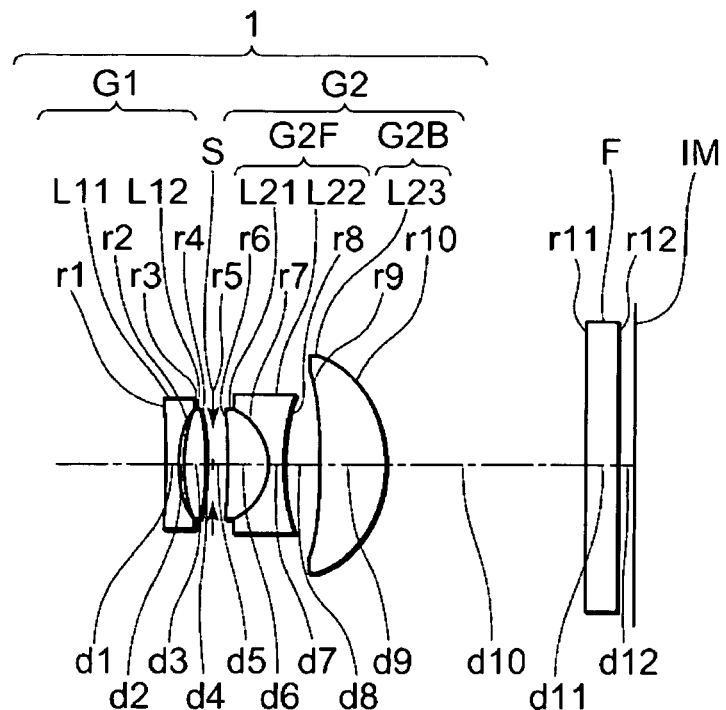
FIG. 5 is a sectional view along an optical axis of Example 3 of the image forming optical system of the present invention.
Figure 6:
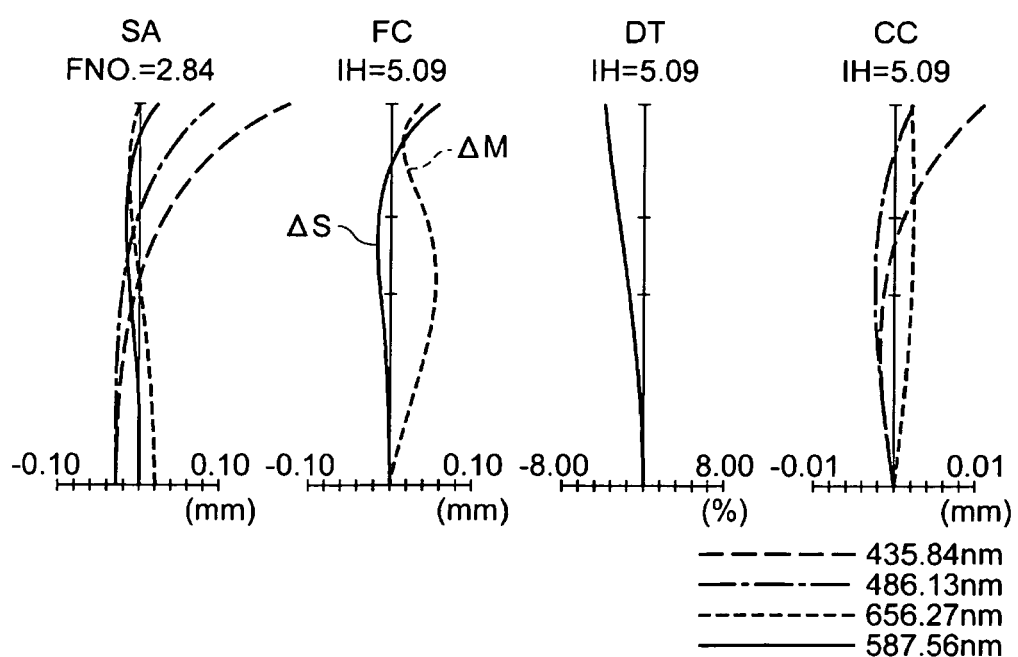
FIG. 6 is a graph showing spherical aberration, astigmatism, distortion and chromatic aberration of magnification of Example 3.

FIG. 5 is a sectional view along an optical axis of Example 3. FIG. 6 is a graph showing spherical aberration SA, astigmatism FC, distortion DT and chromatic aberration CC of magnification of Example 3. It is to be noted that in FIG. 6, IH denotes an image height.

An image forming optical system 1 of Example 3 is constituted of, in order from an object side, a first lens unit G1 having a positive refractive power, an aperture stop S and a second lens unit G2 having a positive refractive power. It is to be noted that in FIG. 5, F denotes a plane parallel plate such as a low-pass filter, cover glass of an electronic image sensor or an infrared cutting filter, and IM denotes a light receiving surface of the electronic image sensor.

The first lens unit G1 is constituted of, in order from the object side, a double-concave lens L11, and a double-convex lens L12.

The second lens unit G2 is constituted of, in order from the object side, a front lens unit G2F, and a rear lens unit G2B.

The front lens unit G2F is constituted of a cemented lens of a positive meniscus lens L21 whose concave surface faces the object side and a double-concave lens L22 in order from the object side, and has a negative refractive power.

The rear lens unit G2B is constituted of one positive meniscus lens L23 whose convex surface faces the image side.

Moreover, opposite surfaces of the positive meniscus lens L23 are formed into aspherical surfaces.

Next, there will be described numerical data of optical members constituting the image forming optical system of Example 3.

Numerical Data 3 (Example 3)

| FL: 7.917 | FNO.: 2.84 | 2ω: 59.77° | |
|---|---|---|---|
| $r_1 = -42.057$ | $d_1 = 0.42$ | $n_{d1} = 1.48749$ | $v_{d1} = 70.23$ |
| $r_2 = 3.399$ | $d_2 = 0.22$ | | |
| $r_3 = 6.180$ | $d_3 = 0.67$ | $n_{d3} = 2.00330$ | $v_{d3} = 28.27$ |
| $r_4 = -14.525$ | $d_4 = 0.20$ | | |
| $r_5 = \infty(AS)$ | $d_5 = 0.60$ | | |
| $r_6 = -29.640$ | $d_6 = 1.39$ | $n_{d6} = 1.81600$ | $v_{d6} = 46.62$ |
| $r_7 = -2.072$ | $d_7 = 0.56$ | $n_{d7} = 1.80518$ | $v_{d7} = 25.42$ |
| $r_8 = 7.489$ | $d_8 = 1.23$ | | |
| $r_9 = -25.033(A)$ | $d_9 = 2.26$ | $n_{d9} = 1.80610$ | $v_{d9} = 40.92$ |
| $r_{10} = -4.326(A)$ | $d_{10} = 6.96$ | | |
| $r_{11} = \infty$ | $d_{11} = 1.00$ | $n_{d11} = 1.51633$ | $v_{d11} = 64.14$ |
| $r_{12} = \infty$ | $d_{12} = 0.50$ | | |

Aspherical Coefficient

| surface number | k | $A_4$ | $A_6$ | $A_8$ | $A_{10}$ |
|---|---|---|---|---|---|
| 9 | 0.000 | $-1.24930 \times 10^{-3}$ | $1.27758 \times 10^{-5}$ | $-2.50583 \times 10^{-8}$ | $4.34187 \times 10^{-7}$ |
| 10 | $-3.085$ | $-4.74704 \times 10^{-3}$ | $9.45350 \times 10^{-5}$ | $-8.87379 \times 10^{-6}$ | |

EXAMPLE 4

Figure 7:
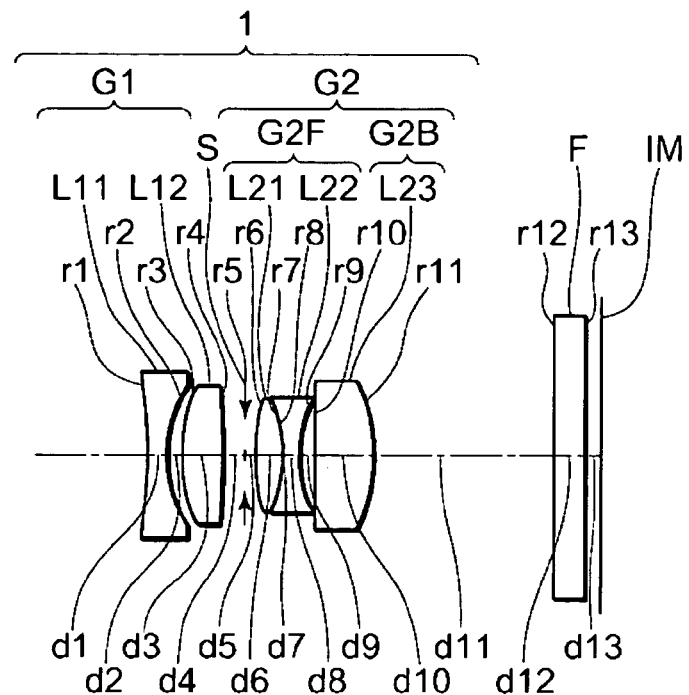
FIG. 7 is a sectional view along an optical axis of Example 4 of the image forming optical system of the present invention.
Figure 8:
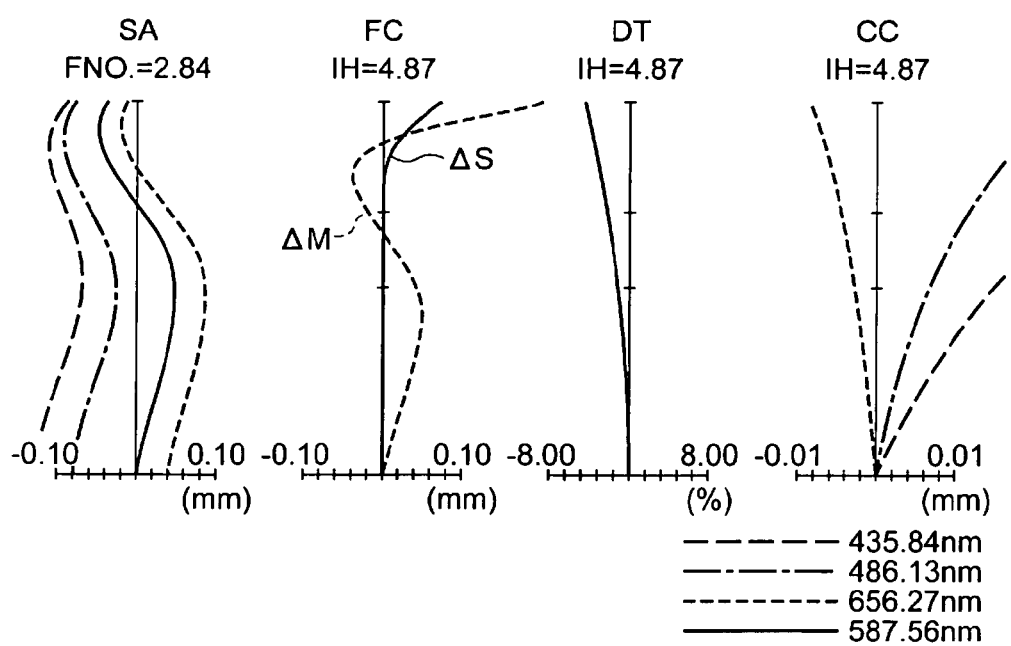
FIG. 8 is a graph showing spherical aberration, astigmatism, distortion and chromatic aberration of magnification of Example 4.

FIG. 7 is a sectional view along an optical axis of Example 4. FIG. 8 is a graph showing spherical aberration SA, astigmatism FC, distortion DT and chromatic aberration CC of magnification of Example 4. It is to be noted that in FIG. 8, IH denotes an image height.

An image forming optical system 1 of Example 4 is constituted of, in order from an object side, a first lens unit G1 having a positive refractive power, an aperture stop S and a second lens unit G2 having a positive refractive power. It is to be noted that in FIG. 7, F denotes a plane parallel plate such as a low-pass filter, cover glass of an electronic image sensor or an infrared cutting filter, and IM denotes a light receiving surface of the electronic image sensor.

The first lens unit G1 is constituted of, in order from the object side, a double-concave lens L11, and a double-convex lens L12.

The second lens unit G2 is constituted of, in order from the object side, a front lens unit G2F, and a rear lens unit G2B.

The front lens unit G2F is constituted of, in order from the object side, a double-convex lens L21 and a double-concave lens L22, and has a negative refractive power.

The rear lens unit G2B is constituted of one positive meniscus lens L23 whose convex surface faces the image side.

Moreover, the object-side surface of the positive meniscus lens L23 is formed into an aspherical surface.

Next, there will be described numerical data of optical members constituting the image forming optical system of Example 4.

Numerical Data 4 (Example 4)

| FL: 7.926 | FNO.: 2.84 | 2ω: 59.72° | |
|---|---|---|---|
| $r_1 = -13.342$ | $d_1 = 0.55$ | $n_{d1} = 1.51633$ | $v_{d1} = 64.14$ |
| $r_2 = 3.901$ | $d_2 = 0.53$ | | |
| $r_3 = 6.666$ | $d_3 = 1.27$ | $n_{d3} = 2.00330$ | $v_{d3} = 28.27$ |
| $r_4 = -19.454$ | $d_4 = 0.71$ | | |
| $r_5 = \infty(AS)$ | $d_5 = 0.33$ | | |
| $r_6 = 5.582$ | $d_6 = 0.92$ | $n_{d6} = 1.81600$ | $v_{d6} = 46.62$ |
| $r_7 = -4.442$ | $d_7 = 0.01$ | $n_{d7} = 1.56384$ | $v_{d7} = 60.67$ |
| $r_8 = -4.442$ | $d_8 = 0.50$ | $n_{d8} = 1.80518$ | $v_{d8} = 25.42$ |
| $r_9 = 3.935$ | $d_9 = 0.54$ | | |
| $r_{10} = -36.446(A)$ | $d_{10} = 1.80$ | $n_{d10} = 1.80610$ | $v_{d10} = 40.92$ |
| $r_{11} = -5.838$ | $d_{11} = 5.77$ | | |
| $r_{12} = \infty$ | $d_{12} = 1.00$ | $n_{d12} = 1.51633$ | $v_{d12} = 64.14$ |
| $r_{13} = \infty$ | $d_{13} = 0.52$ | | |

Aspherical Coefficient

| surface number | k | $A_4$ | $A_6$ | $A_8$ | $A_{10}$ |
|---|---|---|---|---|---|
| 10 | $-0.000$ | $-2.15144 \times 10^{-3}$ | $3.10333 \times 10^{-3}$ | $-1.26224 \times 10^{-3}$ | $1.80639 \times 10^{-4}$ |

EXAMPLE 5

Figure 9:
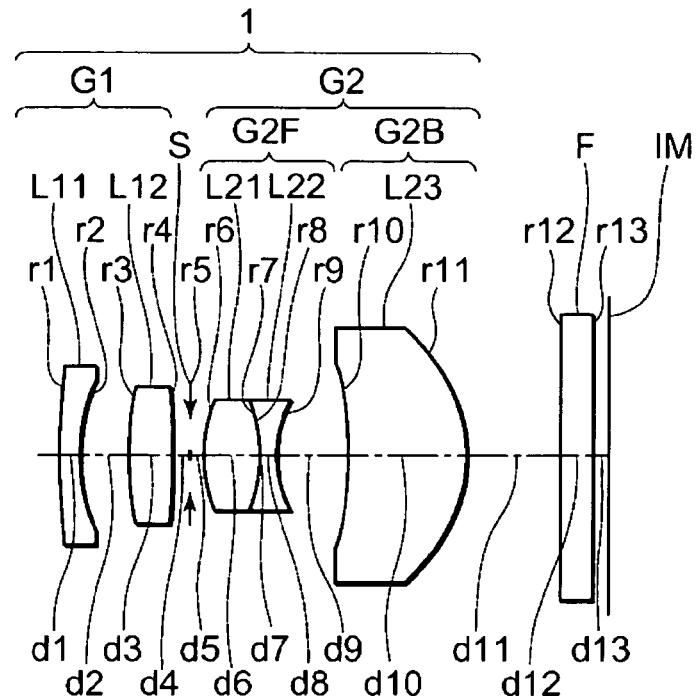
FIG. 9 is a sectional view along an optical axis of Example 5 of the image forming optical system of the present invention.
Figure 10:
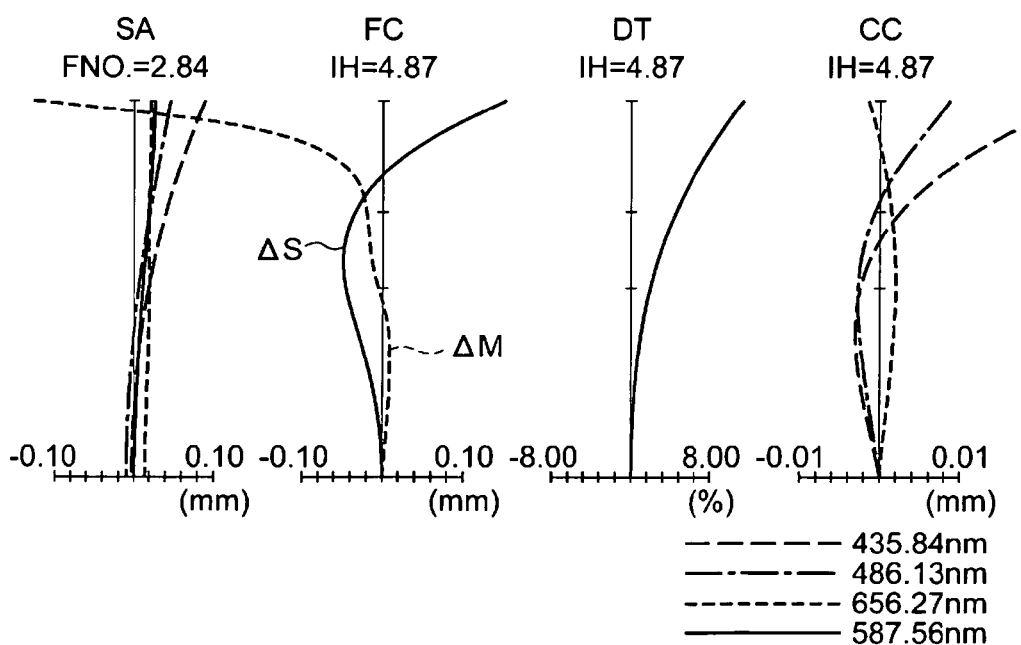
FIG. 10 is a graph showing spherical aberration, astigmatism, distortion and chromatic aberration of magnification of Example 5.

FIG. 9 is a sectional view along an optical axis of Example 5. FIG. 10 is a graph showing spherical aberration SA, astigmatism FC, distortion DT and chromatic aberration CC of magnification of Example 5. It is to be noted that in FIG. 10, IH denotes an image height.

An image forming optical system 1 of Example 5 is constituted of, in order from an object side, a first lens unit G1 having a positive refractive power, an aperture stop S and a second lens unit G2 having a positive refractive power. It is to be noted that in FIG. 9, F denotes a plane parallel plate such as a low-pass filter, cover glass of an electronic image sensor or an infrared cutting filter, and IM denotes a light receiving surface of the electronic image sensor.

The first lens unit G1 is constituted of, in order from the object side, a negative meniscus lens L11 whose convex surface faces the object side, and a double-convex lens L12.

The second lens unit G2 is constituted of, in order from the object side, a front lens unit G2F, and a rear lens unit G2B.

The front lens unit G2F is constituted of, in order from the object side, a double-convex lens L21 and a double-concave lens L22, and has a negative refractive power.

The rear lens unit G2B is constituted of one positive meniscus lens L23 whose convex surface faces the image side.

Moreover, the object-side surface of the positive meniscus lens L23 is formed into an aspherical surface.

Next, there will be described numerical data of optical members constituting the image forming optical system of Example 5.

Numerical Data 5 (Example 5)

| FL: 8.288 | FNO.: 2.84 | 2ω: 59.53° | |
|---|---|---|---|
| $r_1 = 98.943$ | $d_1 = 0.55$ | $n_{d1} = 1.51633$ | $v_{d1} = 64.14$ |
| $r_2 = 6.459$ | $d_2 = 1.63$ | | |
| $r_3 = 11.609$ | $d_3 = 1.43$ | $n_{d3} = 2.00330$ | $v_{d3} = 28.27$ |
| $r_4 = -35.108$ | $d_4 = 0.60$ | | |
| $r_5 = \infty(AS)$ | $d_5 = 0.40$ | | |
| $r_6 = 4.858$ | $d_6 = 1.95$ | $n_{d6} = 1.81600$ | $v_{d6} = 46.62$ |
| $r_7 = -3.964$ | $d_7 = 0.01$ | $n_{d7} = 1.56384$ | $v_{d7} = 60.67$ |
| $r_8 = -3.964$ | $d_8 = 0.50$ | $n_{d8} = 1.80518$ | $v_{d8} = 25.42$ |
| $r_9 = 3.378$ | $d_9 = 2.43$ | | |
| $r_{10} = -36.446(A)$ | $d_{10} = 4.01$ | $n_{d10} = 1.80610$ | $v_{d10} = 40.92$ |
| $r_{11} = -5.253$ | $d_{11} = 3.03$ | | |
| $r_{12} = \infty$ | $d_{12} = 1.00$ | $n_{d12} = 1.51633$ | $v_{d12} = 64.14$ |
| $r_{13} = \infty$ | $d_{13} = 0.49$ | | |

Aspherical Coefficient

| surface number | k | $A_4$ | $A_6$ | $A_8$ | $A_{10}$ |
|---|---|---|---|---|---|
| 10 | 1.928 | $-2.93456 \times 10^{-3}$ | $7.98693 \times 10^{-5}$ | $-1.41098 \times 10^{-5}$ | $1.02597 \times 10^{-6}$ |

EXAMPLE 6

Figure 11:
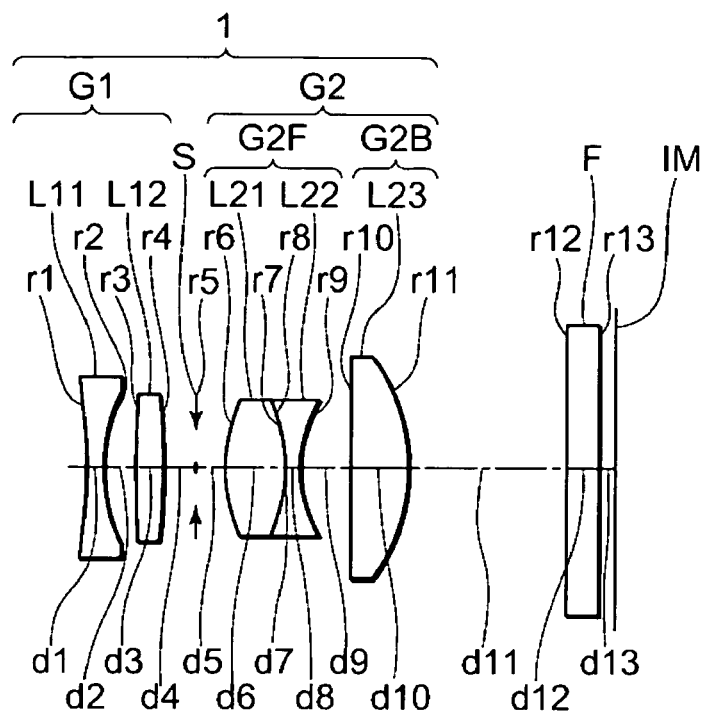
FIG. 11 is a sectional view along an optical axis of Example 6 of the image forming optical system of the present invention.
Figure 12:
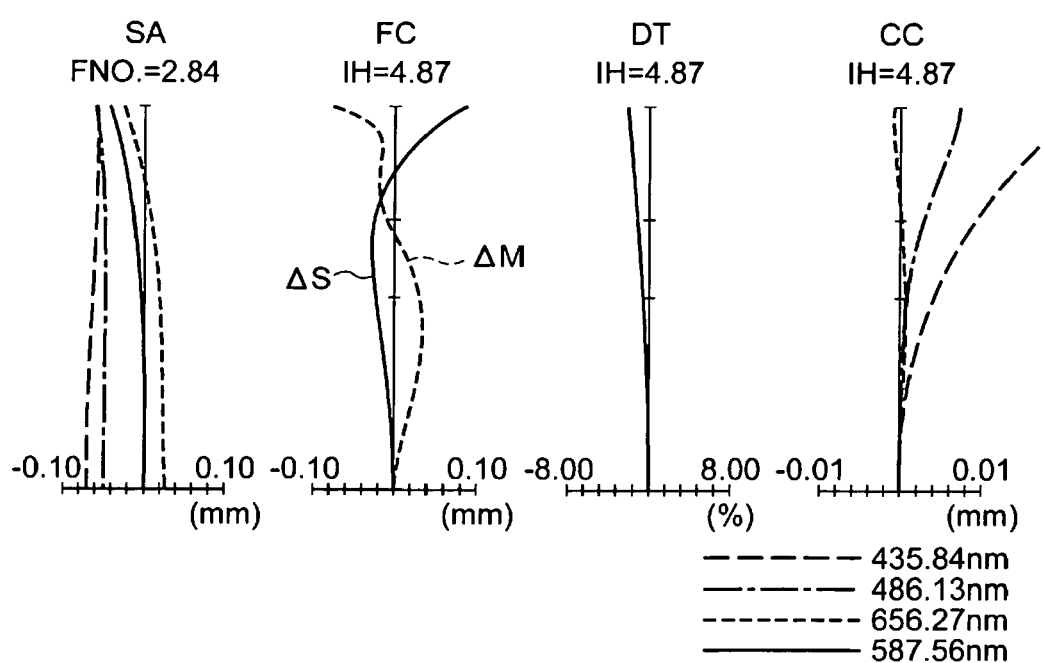
FIG. 12 is a graph showing spherical aberration, astigmatism, distortion and chromatic aberration of magnification of Example 6.

FIG. 11 is a sectional view along an optical axis of Example 6. FIG. 12 is a graph showing spherical aberration SA, astigmatism FC, distortion DT and chromatic aberration CC of magnification of Example 6. It is to be noted that in FIG. 12, IH denotes an image height.

An image forming optical system 1 of Example 6 is constituted of, in order from an object side, a first lens unit G1 having a positive refractive power, an aperture stop S and a second lens unit G2 having a positive refractive power. It is to be noted that in FIG. 11, F denotes a plane parallel plate such as a low-pass filter, cover glass of an electronic image sensor or an infrared cutting filter, and IM denotes a light receiving surface of the electronic image sensor.

The first lens unit G1 is constituted of, in order from the object side, a double-concave lens L11, and a double-convex lens L12.

The second lens unit G2 is constituted of, in order from the object side, a front lens unit G2F, and a rear lens unit G2B.

The front lens unit G2F is constituted of, in order from the object side, a double-convex lens L21 and a double-concave lens L22, and has a negative refractive power.

The rear lens unit G2B is constituted of one positive meniscus lens L23 whose convex surface faces the image side.

Moreover, the object-side surface of the positive meniscus lens L23 is formed into an aspherical surface.

Next, there will be described numerical data of optical members constituting the image forming optical system of Example 6.

Numerical Data 6 (Example 6)

| FL: 7.905 | FNO.: 2.84 | 2ω: 59.84° | |
|---|---|---|---|
| $r_1 = -17.666$ | $d_1 = 0.55$ | $n_{d1} = 1.51633$ | $v_{d1} = 64.14$ |
| $r_2 = 6.063$ | $d_2 = 0.99$ | | |
| $r_3 = 27.036$ | $d_3 = 0.97$ | $n_{d3} = 2.00330$ | $v_{d3} = 28.27$ |
| $r_4 = -12.964$ | $d_4 = 1.07$ | | |
| $r_5 = \infty(AS)$ | $d_5 = 0.91$ | | |
| $r_6 = 5.343$ | $d_6 = 1.99$ | $n_{d6} = 1.81600$ | $v_{d6} = 46.62$ |
| $r_7 = -5.533$ | $d_7 = 0.01$ | $n_{d7} = 1.56384$ | $v_{d7} = 60.67$ |
| $r_8 = -5.533$ | $d_8 = 0.50$ | $n_{d8} = 1.80518$ | $v_{d8} = 25.42$ |
| $r_9 = 4.109$ | $d_9 = 1.70$ | | |
| $r_{10} = -367.643(A)$ | $d_{10} = 1.90$ | $n_{d10} = 1.80610$ | $v_{d10} = 40.92$ |
| $r_{11} = -6.078$ | $d_{11} = 5.28$ | | |
| $r_{12} = \infty$ | $d_{12} = 1.00$ | $n_{d12} = 1.51633$ | $v_{d12} = 64.14$ |
| $r_{13} = \infty$ | $d_{13} = 0.50$ | | |

Aspherical Coefficient

| surface number | k | $A_4$ | $A_6$ | $A_8$ | $A_{10}$ |
|---|---|---|---|---|---|
| 10 | $-0.384$ | $-6.92440 \times 10^{-4}$ | $1.14846 \times 10^{-4}$ | $-9.69040 \times 10^{-6}$ | $5.29379 \times 10^{-7}$ |

EXAMPLE 7

Figure 13:
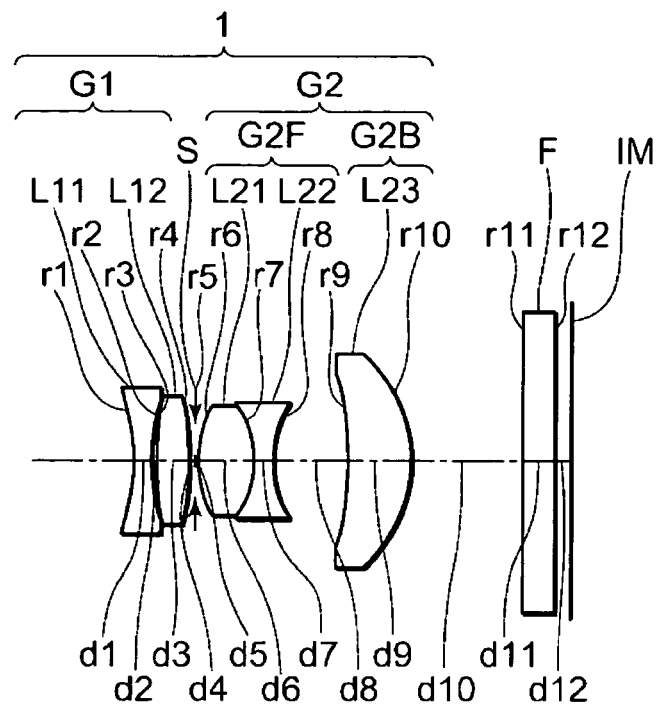
FIG. 13 is a sectional view along an optical axis of Example 7 of the image forming optical system of the present invention.
Figure 14:
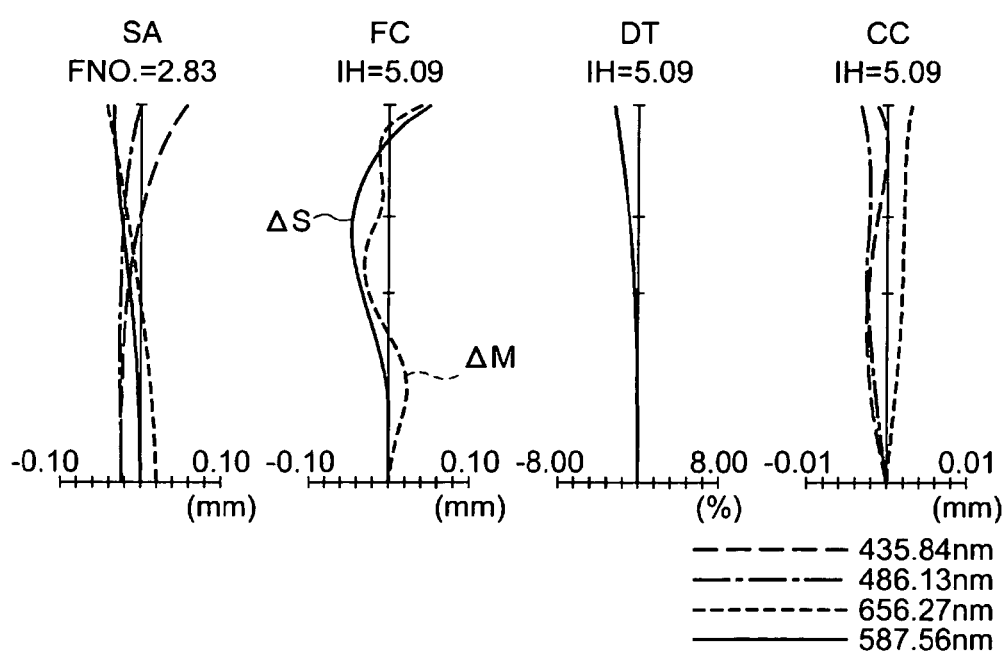
FIG. 14 is a graph showing spherical aberration, astigmatism, distortion and chromatic aberration of magnification of Example 7.

FIG. 13 is a sectional view along an optical axis of Example 7. FIG. 14 is a graph showing spherical aberration SA, astigmatism FC, distortion DT and chromatic aberration CC of magnification of Example 7. It is to be noted that in FIG. 14, IH denotes an image height.

An image forming optical system 1 of Example 7 is constituted of, in order from an object side, a first lens unit G1 having a positive refractive power, an aperture stop S and a second lens unit G2 having a positive refractive power. It is to be noted that in FIG. 13, F denotes a plane parallel plate such as a low-pass filter, cover glass of an electronic image sensor or an infrared cutting filter, and IM denotes a light receiving surface of the electronic image sensor.

The first lens unit G1 is constituted of, in order from the object side, a double-concave lens L11, and a double-convex lens L12.

The second lens unit G2 is constituted of, in order from the object side, a front lens unit G2F, and a rear lens unit G2B.

The front lens unit G2F is constituted of, in order from the object side, a double-convex lens L21 and a double-concave lens L22, and the whole unit has a negative refractive power.

The rear lens unit G2B is constituted of one positive meniscus lens L23 whose convex surface faces the image side.

Moreover, opposite surfaces of the positive meniscus lens L23 is formed into aspherical surfaces.

Next, there will be described numerical data of optical members constituting the image forming optical system of Example 7.

Numerical Data 7 (Example 7)

| FL: 7.920 | FNO.: 2.83 | 2ω: 59.75° | |
|---|---|---|---|
| $r_1 = -7.051$ | $d_1 = 0.58$ | $n_{d1} = 1.48749$ | $v_{d1} = 70.23$ |
| $r_2 = 6.600$ | $d_2 = 0.25$ | | |
| $r_3 = 16.012$ | $d_3 = 1.11$ | $n_{d3} = 2.00330$ | $v_{d3} = 28.27$ |
| $r_4 = -9.243$ | $d_4 = 0.20$ | | |
| $r_5 = \infty(AS)$ | $d_5 = 0.09$ | | |
| $r_6 = 5.618$ | $d_6 = 1.93$ | $n_{d6} = 1.81600$ | $v_{d6} = 46.62$ |
| $r_7 = -2.988$ | $d_7 = 0.69$ | $n_{d7} = 1.80518$ | $v_{d7} = 25.42$ |
| $r_8 = 4.126$ | $d_8 = 2.47$ | | |
| $r_9 = -24.749(A)$ | $d_9 = 2.25$ | $n_{d9} = 1.80610$ | $v_{d9} = 40.92$ |
| $r_{10} = -5.211(A)$ | $d_{10} = 4.04$ | | |
| $r_{11} = \infty$ | $d_{11} = 1.00$ | $n_{d11} = 1.51633$ | $v_{d11} = 64.14$ |
| $r_{12} = \infty$ | $d_{12} = 0.50$ | | |

Aspherical Coefficient

| surface number | k | $A_4$ | $A_6$ | $A_8$ | $A_{10}$ |
|---|---|---|---|---|---|
| 9 | 0.000 | $-5.60513 \times 10^{-4}$ | $-2.74380 \times 10^{-5}$ | $-9.90355 \times 10^{-6}$ | $6.51880 \times 10^{-7}$ |
| 10 | $-5.136$ | $-3.97226 \times 10^{-3}$ | $1.37419 \times 10^{-4}$ | $-8.28926 \times 10^{-6}$ | |

EXAMPLE 8

Figure 15:
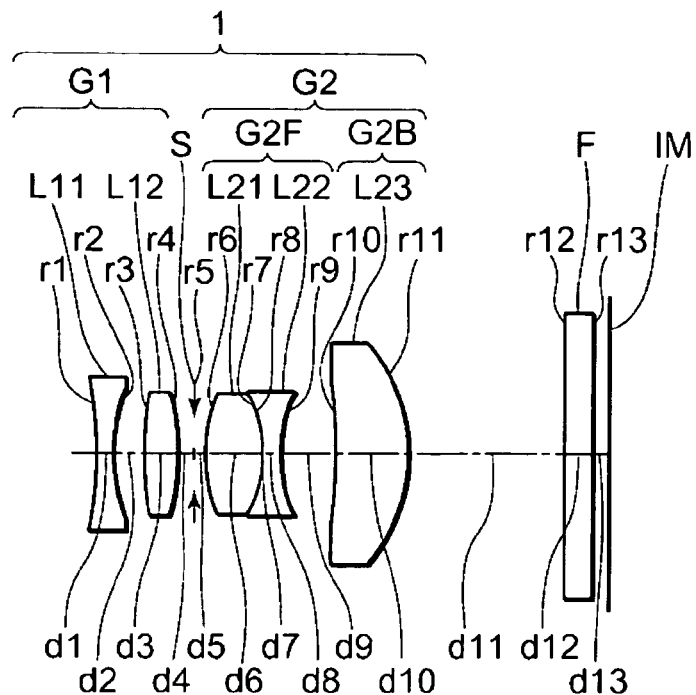
FIG. 15 is a sectional view along an optical axis of Example 8 of the image forming optical system of the present invention.
Figure 16:
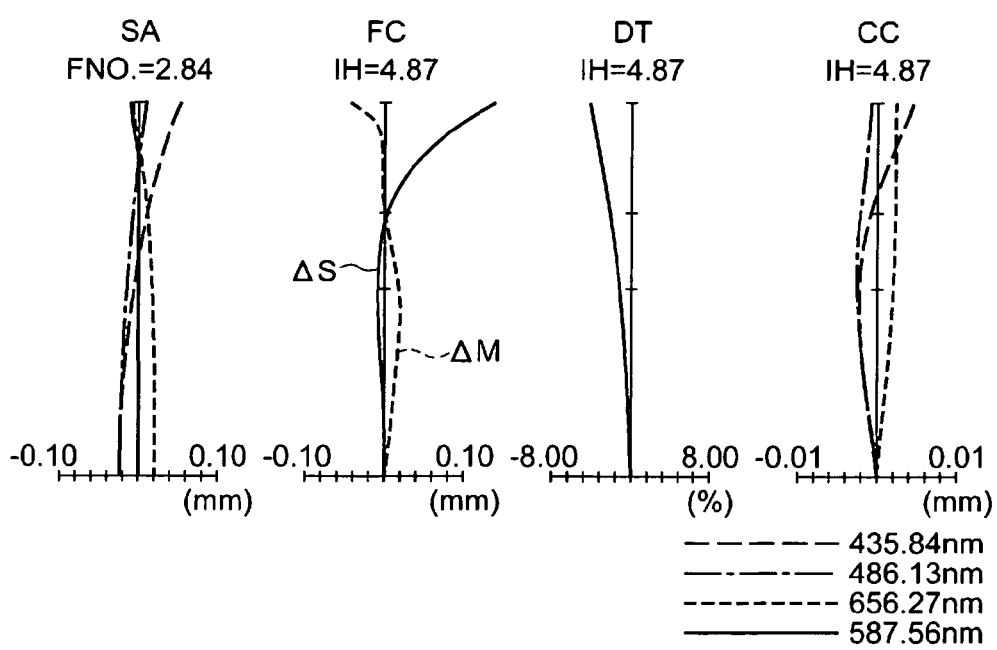
FIG. 16 is a graph showing spherical aberration, astigmatism, distortion and chromatic aberration of magnification of Example 8.

FIG. 15 is a sectional view along an optical axis of Example 8. FIG. 16 is a graph showing spherical aberration SA, astigmatism FC, distortion DT and chromatic aberration CC of magnification of Example 8. It is to be noted that in FIG. 16, IH denotes an image height.

An image forming optical system 1 of Example 8 is constituted of, in order from an object side, a first lens unit G1 having a positive refractive power, an aperture stop S and a second lens unit G2 having a positive refractive power. It is to be noted that in FIG. 15, F denotes a plane parallel plate such as a low-pass filter, cover glass of an electronic image sensor or an infrared cutting filter, and IM denotes a light receiving surface of the electronic image sensor.

The first lens unit G1 is constituted of, in order from the object side, a double-concave lens L11, and a double-convex lens L12.

The second lens unit G2 is constituted of, in order from the object side, a front lens unit G2F, and a rear lens unit G2B.

The front lens unit G2F is constituted of, in order from the object side, a double-convex lens L21 and a double-concave lens L22, and has a negative refractive power.

The rear lens unit G2B is constituted of one positive meniscus lens L23 whose convex surface faces the image side.

Moreover, the object-side surface of the positive meniscus lens L23 is formed into an aspherical surface.

Next, there will be described numerical data of optical members constituting the image forming optical system of Example 8.

Numerical Data 8 (Example 8)

| FL: 7.949 | FNO.: 2.84 | 2ω: 59.57° | |
|---|---|---|---|
| $r_1 = -13.342$ | $d_1 = 0.55$ | $n_{d1} = 1.51633$ | $v_{d1} = 64.14$ |
| $r_2 = 5.741$ | $d_2 = 1.01$ | | |
| $r_3 = 19.901$ | $d_3 = 1.11$ | $n_{d3} = 2.09500$ | $v_{d3} = 29.42$ |
| $r_4 = -13.187$ | $d_4 = 0.60$ | | |
| $r_5 = \infty(AS)$ | $d_5 = 0.40$ | | |
| $r_6 = 5.582$ | $d_6 = 1.95$ | $n_{d6} = 1.81600$ | $v_{d6} = 46.62$ |
| $r_7 = -4.079$ | $d_7 = 0.01$ | $n_{d7} = 1.56384$ | $v_{d7} = 60.67$ |
| $r_8 = -4.079$ | $d_8 = 0.50$ | $n_{d8} = 1.80518$ | $v_{d8} = 25.42$ |
| $r_9 = 4.079$ | $d_9 = 1.87$ | | |
| $r_{10} = -36.446(A)$ | $d_{10} = 2.40$ | $n_{d10} = 1.80610$ | $v_{d10} = 40.92$ |
| $r_{11} = -5.657$ | $d_{11} = 5.31$ | | |
| $r_{12} = \infty$ | $d_{12} = 1.00$ | $n_{d12} = 1.51633$ | $v_{d12} = 64.14$ |
| $r_{13} = \infty$ | $d_{13} = 0.49$ | | |

Aspherical Coefficient

| surface number | k | $A_4$ | $A_6$ | $A_8$ | $A_{10}$ |
|---|---|---|---|---|---|
| 10 | 0.000 | $-7.98720 \times 10^{-4}$ | $1.00070 \times 10^{-4}$ | $-8.05030 \times 10^{-6}$ | $5.36210 \times 10^{-7}$ |

Next, Table 1 shows numerical parameter corresponding values of conditions in the examples.

TABLE 1

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| R2/R3 | −0.1119 | −0.5062 | −0.2992 | −0.1080 | −0.0927 | −0.0112 | −0.1667 | −0.1119 |
| ΣD2G/FL | 0.845 | 0.820 | 0.688 | 0.476 | 1.073 | 0.771 | 0.928 | 0.846 |
| n1 | 2.0033 | 2.0033 | 2.0033 | 2.0033 | 2.0033 | 2.0033 | 2.0033 | 2.0950 |
| FL/fG2F | −0.0768 | −0.0122 | −1.0502 | −0.2567 | −0.1135 | −0.0022 | −0.0432 | −0.0767 |
| Σd/TL | 0.6167 | 0.6122 | 0.4822 | 0.5076 | 0.7637 | 0.6221 | 0.6493 | 0.6169 |
| dS/TL | 0.0594 | 0.0601 | 0.0511 | 0.0734 | 0.0565 | 0.1162 | 0.0199 | 0.0593 |

When the above image forming optical system is in a used state, the position of the exit pupil is easily set to be far from the image surface. Moreover, even when the thickness from the incidence surface to the exit surface of the image forming optical system is reduced, it is possible to correct the aberration with a good balance.

The above image forming optical system can be used in an electronic image pickup apparatus, especially a digital camera and a video camera, a personal computer as an example of an information processing apparatus, a cellular phone and the like. There will be described hereinafter examples in which the image forming optical system of the present invention is used in a collapsible lens barrel type compact digital camera and the cellular phone.

Figure 17:
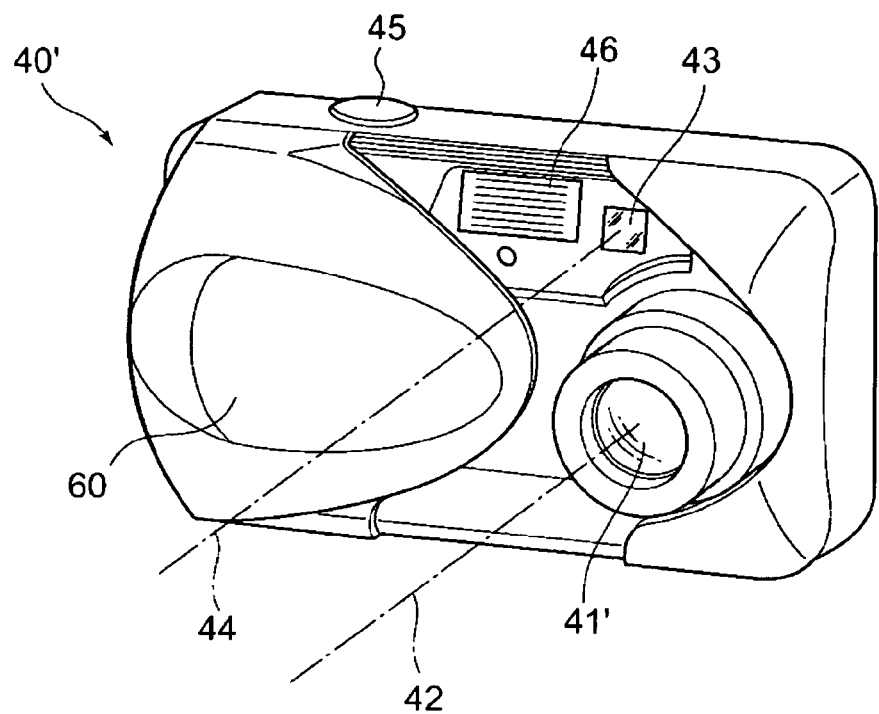
FIG. 17 is a front perspective view showing an appearance of one example of a compact digital camera with a collapsible lens barrel in which the image forming optical system of the present invention is incorporated.
Figure 18:
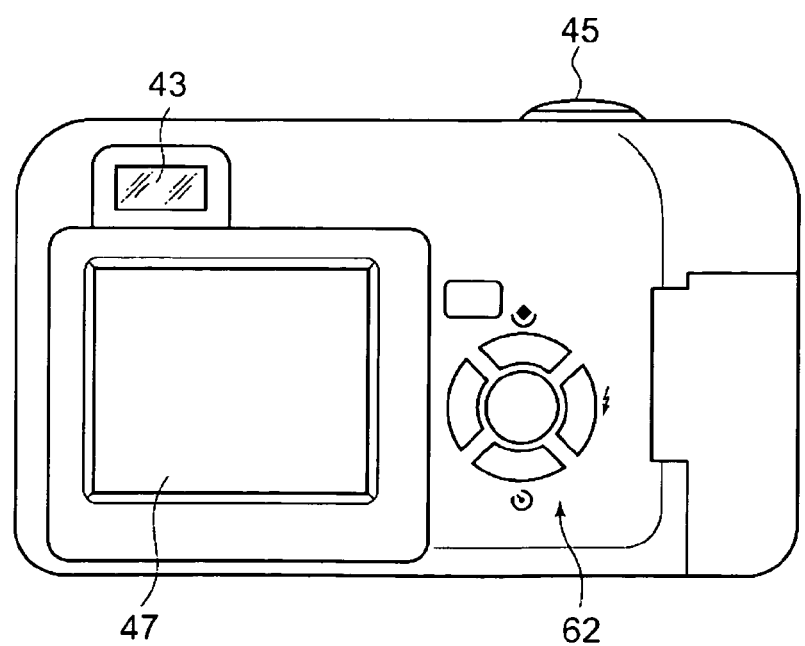
FIG. 18 is a rear view of the digital camera shown in FIG. 17.
Figure 19:
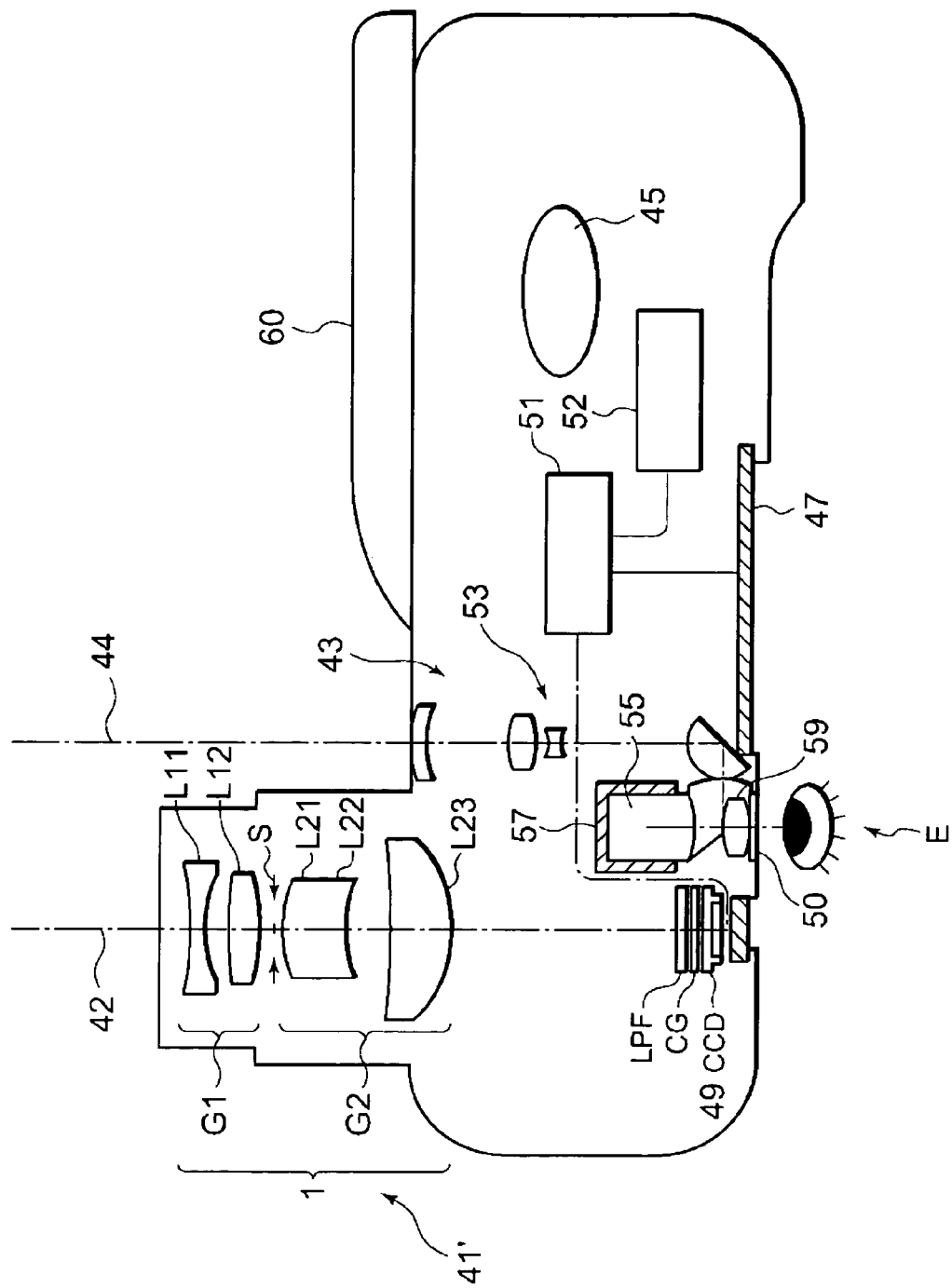
FIG. 19 is a schematic see-through plan view showing the constitution of the digital camera shown in FIG. 17.

FIGS. 17 to 20 show conceptual diagrams of a constitution in which the image forming optical system (e.g., the image forming optical system of Example 1) of the present invention is used as a photographing optical system of a compact digital camera with a collapsible type lens barrel. FIG. 17 is a front perspective view showing an appearance of a digital camera, FIG. 18 is a rear view of the digital camera, and FIG. 19 is a schematic see-through plan view showing a constitution of the digital camera. FIGS. 17 and 19 show a state in which the lens barrel is not collapsed in the body of the digital camera.

In this example, the digital camera 40' includes: the photographing optical system 41' having a photographing optical path 42; a finder optical system 43 having an optical path 44 for a finder; a shutter button 45; a flash lamp 46; a liquid crystal display monitor 47; a setting change switch 62 and the like. In a case where the lens barrel of the photographing optical system 41' is collapsed, when a cover 60 is slid, the photographing optical system 41', the finder optical system 43 and the flash lamp 46 are covered with the cover 60. Moreover, when the cover 60 is opened to set the camera 40' to a photographing state, the photographing optical system 41' is brought into the non-collapsed state as shown in FIGS. 17 and 19. When the shutter button 45 disposed in the upper portion of the camera 40' is pressed, the photographing is performed through the photographing optical system 41' in response to the pressed button.

An object image is formed by the photographing optical system 41' on the image pickup surface of the CCD 49 via a low-pass filter LPF and cover glass CG. The object image received by this CCD 49 is displayed as an electronic image in the liquid crystal display monitor 47 disposed in the rear surface of the camera via processing section 51. This processing section 51 is connected to recording section 52, and the photographed electronic image can be recorded. It is to be noted that this recording section 52 may be disposed separately from the processing section 51 or may be integrated with the processing section 51.

Furthermore, an objective optical system 53 for the finder is disposed along the optical path 44 for the finder. The objective optical system 53 for the finder includes a plurality of lens units (three units in the drawing) and two prisms. The object image formed by the objective optical system 53 for the finder is formed on the surface of a view field frame 57 of an erecting prism 55 which is an image erecting member. The erecting prism 55 is constituted of a plurality of prisms, and has an image erecting function similar to the function of the Porro prism by combination with the prisms disposed in the objective optical system for the finder. The view field frame 57 is disposed between the prisms of the erecting prism 55. Behind the erecting prism 55, there is disposed an eyepiece optical system 59 which guides an erected image into an observer's eyeball E. It is to be noted that a cover member 50 is disposed on the exit side of the eyepiece optical system 59.

In the digital camera 40' constituted in this manner, since the photographing optical system 41' has a high performance and is small-sized, and the photographing optical system can be stored in a collapsed state, the high performance and miniaturization can be realized.

Figure 20:
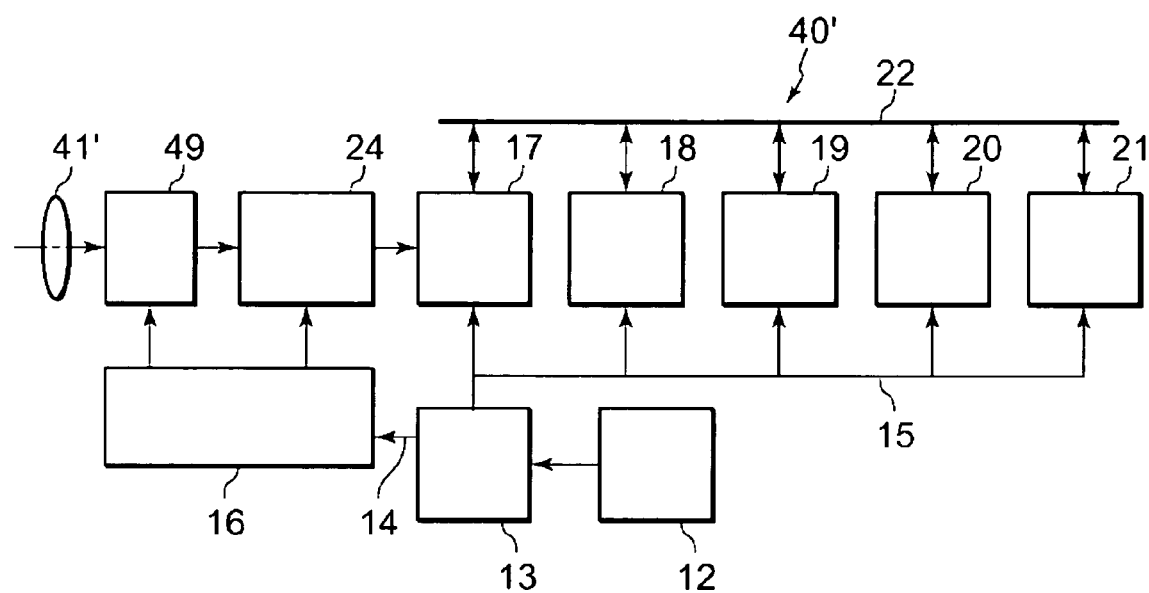
FIG. 20 is a block diagram of a major part of the electronic circuit of the digital camera shown in FIG. 17.

FIG. 20 is a block diagram of a major part of the electronic circuit of the digital camera 40'. It is to be noted that in the following description, the above processing section 51 includes a part constituted of a CDS/ADC section 24, a temporary storage memory 17 and an image processing section 18, and the recording section 52 includes a recording medium control section 19.

As shown in FIG. 20, the digital camera 40' includes: an operating section 12; a control section 13 connected to the operating section 12; and an image sensor driving circuit 16, the temporary storage memory 17, the image processing section 18, the recording medium control section 19, a display section 20 and a setting information storage memory section 21 connected to control signal output ports of the control section 13 via buses 14 and 15.

The above temporary storage memory 17, the image processing section 18, the recording medium control section 19, the display section 20 and the setting information storage memory section 21 are constituted so that data can be input or output mutually via a bus 22. The image sensor driving circuit 16 is connected to the CCD 49 and the CDS/ADC section 24.

The operating section 12 includes various input buttons and switches, and is a circuit which notifies a control section of event information input from the outside (camera user) via these input buttons and switches (e.g., the shutter button 45 and the setting change switch 62). The control section 13 includes a central processing unit, and is a circuit in which a program memory (not shown) is incorporated. In accordance with a program stored in the program memory, the circuit receives an instruction or a command input from the camera user via the operating section 12 to control the operation of the digital camera 40'.

The CCD 49 receives the object image formed by the photographing optical system 41' constituted using the image forming optical system of the present invention. The CCD 49 is an image sensor driven and controlled by the image sensor driving circuit 16 to convert a quantity of light of each pixel of the object image into an electric signal and output the signal to the CDS/ADC section 24.

The CDS/ADC section 24 is a circuit which amplifies the electric signal output from the CCD 49 to perform analog/digital conversion. The circuit outputs, to the temporary storage memory 17, video bare data (hereinafter referred to as the raw data) subjected to only the above mentioned amplification and analog/digital conversion.

The temporary storage memory 17 is a buffer constituted of, for example, an SDRAM, and is a memory unit in which the raw data output from the CDS/ADC section 24 is temporarily stored. The image processing section 18 is a circuit which reads out the raw data stored in the temporary storage memory 17 or the recording medium control section 19 to electrically perform various types of image processing including distortion correction based on an image quality parameter designated from the control section 13.

The recording medium control section 19 is a control circuit for controlling a device to which a card or stick type recording medium including, for example, a flash memory and the like is detachably attached. In the device, the raw data transferred from the temporary storage memory 17 and/or the image data obtained by processing the image by the image processing section 18 are stored and retained in the card or stick type flash memory. It is to be noted that as the recording medium, besides a semiconductor memory, a hard disk, a DVD or the like is usable.

The display section 20 includes the liquid crystal display monitor 47 and a circuit for displaying an image or an operation menu in the liquid crystal display monitor 47. The setting information storage memory section 21 includes: an ROM portion in which various types of image quality parameters are stored beforehand; and an RAM portion for storing the image quality parameter selected from the image quality parameters stored in the ROM portion, by an input operation of the operating section 12. The setting information storage memory section 21 also includes a circuit which controls input/output with respect to the ROM portion and the RAM portion.

Figure 21:
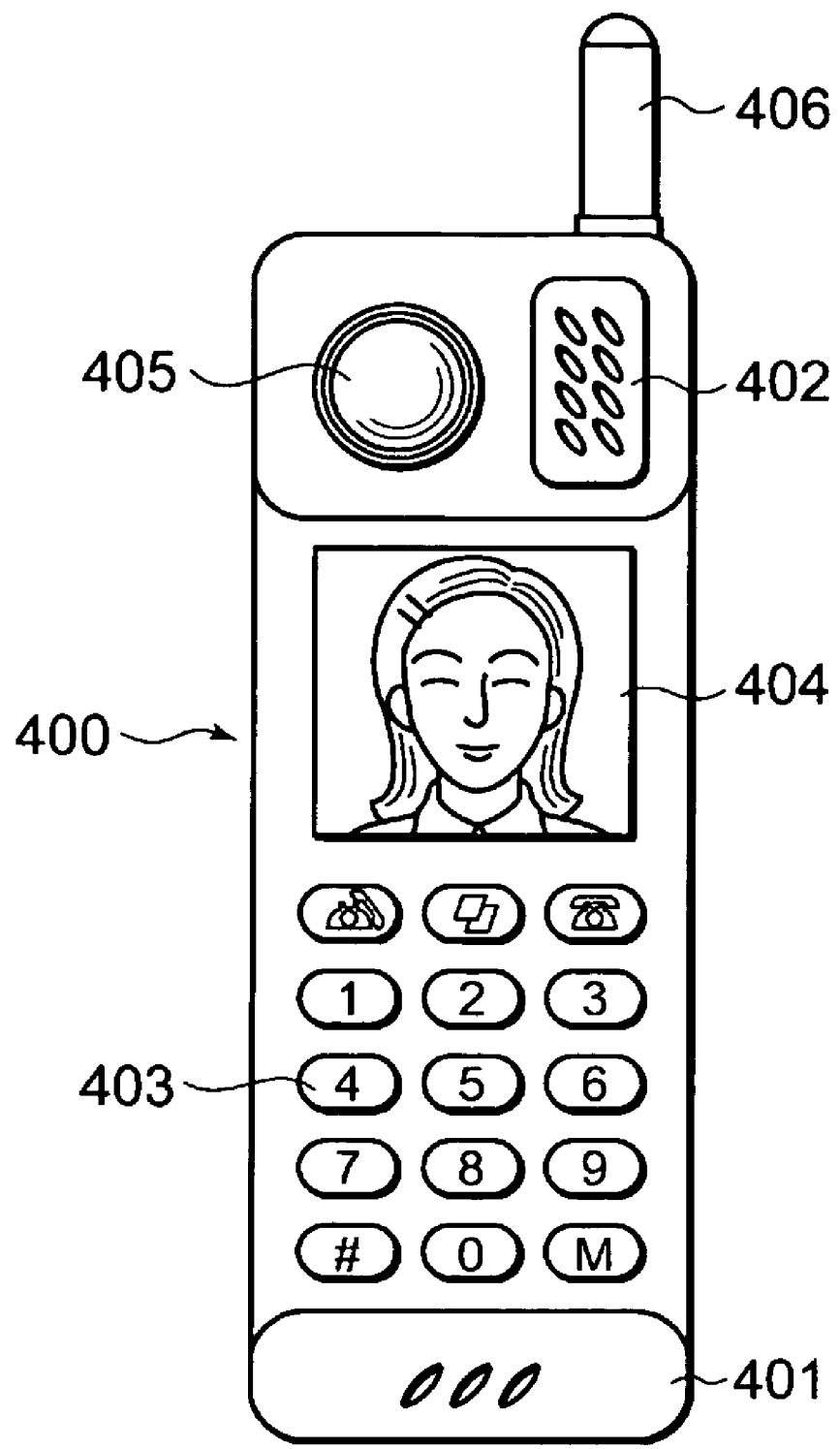
FIG. 21 is a front view of a cellular phone in which the image forming optical system of the present invention is incorporated.
Figure 22:
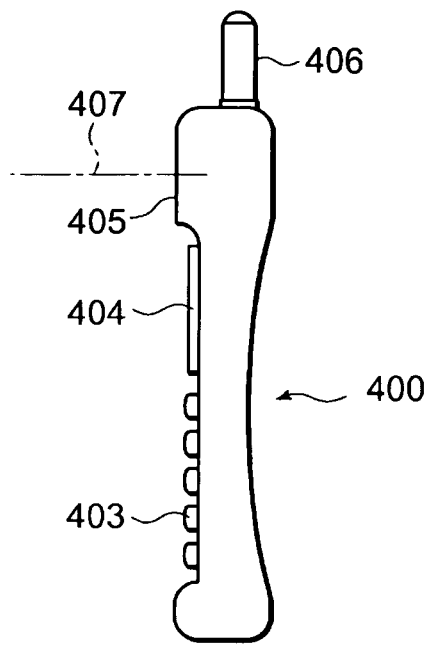
FIG. 22 is a side view of the cellular phone shown in FIG. 21.
Figure 23:
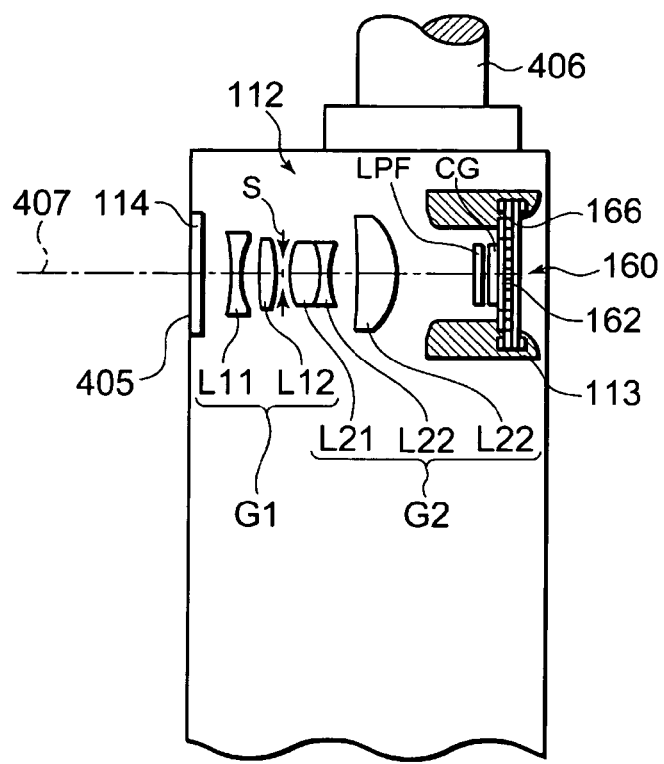
FIG. 23 is a sectional view of the photographing optical system incorporated in the cellular phone shown in FIG. 21.

Next, FIGS. 21 to 23 show a cellular phone as one example of the information processing device in which the image forming optical system of the present invention is incorporated as a photographing optical system. FIG. 21 is a front view of a cellular phone 400, FIG. 22 is a side view, and FIG. 23 is a sectional view of a portion including a photographing optical system 405.

As shown in FIGS. 21 to 23, the cellular phone 400 has: a microphone 401 which inputs operator's voice as information; a speaker 402 which outputs communication partner's voice; input keys 403 for the operator to input information; a monitor 404 which displays a photographed image of the operator, the communication partner or the like, and information such as phone numbers; the photographing optical system 405; an antenna 406 which transmits and receives a communication radio wave; and processing section (not shown) which processes image information, communication information, an input signal and the like. Here, the monitor 404 is a liquid crystal display element. It is to be noted that an arrangement of the constitutions is not limited to this arrangement.

This photographing optical system 405 is disposed along a photographing optical path 407, and has: an objective lens 112 constituted using the image forming optical system (e.g., the image forming optical system of Example 1) of the present invention and; and an image sensor chip 162 which receives an object image. They are incorporated in the cellular phone 400.

Here, cover glass CG is additionally attached onto the image sensor chip 162, and integrated therewith for forming an image sensor unit 160. The unit is attachably fitted into a rear end of a lens barrel 113 of the objective lens 112 through a one-touch operation. This obviates necessity of centering of the objective lens 112 and the image sensor chip 162 or adjusting of a space between surfaces, and the system is easily assembled. On the front end portion (not shown) of the lens barrel 113, there is disposed cover glass 114 for protecting the objective lens 112. It is to be noted that a mechanism for driving the zoom lens in the lens barrel 113 is omitted from the drawing.

An object image received by the image sensor chip 162 is input into the processing section (not shown) via a terminal 166, and displayed as an electronic image in one or both of the monitor 404 and communication partner's monitor. The processing section has a signal processing function of converting information of the object image received by the image sensor chip 162 into a signal transmittable to the communication partner.

The present invention is not limited to the aforementioned embodiments, as it will be immediately apparent that various alternative implementations are possible. Such variations are not to be regarded as a departure from the spirit and scope of the present invention. Rather, the scope of the present invention shall be defined as set forth in the following claims and their legal equivalents. All such modifications as would be obvious to one skilled in the art are intended to be included within the scope of the following claims.

What is claimed is:

1. An image forming optical system comprising, in order from an object side:

a first lens unit having a positive refractive power;
an aperture stop; and
a second lens unit having a positive refractive power,
the first lens unit being a lens unit which is closest to the object side in the image forming optical system;
the second lens unit being a lens unit which is closest to an image side in the image forming optical system,
the second lens unit comprising, in order from the object side:
a front lens unit in which a surface closest to the image side is a concave surface which faces the image side; and
a rear lens unit which has a positive refractive power and in which a surface closest to the object side is a concave surface which faces the object side,
the rear lens unit consisting of one positive meniscus lens whose convex surface faces the image side,
the image forming optical system satisfying the following conditions (1) and (2):

$$-1.0 < R2/R3 < -0.01 \qquad (1); \text{ and}$$

$$0.3 < \Sigma D2G/FL < 1.2 \qquad (2),$$

wherein R2 denotes a paraxial radius of curvature of the surface of the front lens unit closest to the image side, R3 denotes a paraxial radius of curvature of the surface of the rear lens unit closest to the object side, $\Sigma D2G$ denotes an axial length from the surface closest to the object side to the surface closest to the image side in the second lens unit, and FL denotes a focal length of the image forming optical system.

2. The image forming optical system according to claim 1, wherein the front lens unit has a negative refractive power.

3. The image forming optical system according to claim 1, wherein the first lens unit has a lens which is arranged closest to the image side therein and is configured to satisfy the following condition (3):

$$n1>1.9 \quad (3),$$

in which n1 denotes a refractive index of the lens of the first lens unit closest to the image side.

4. The image forming optical system according to claim 1, wherein the first lens unit comprises a negative lens and a positive lens in order from the object side, and
the front lens unit of the second lens unit comprises a positive lens and a negative lens in order from the object side.

5. The image forming optical system according to claim 1, wherein the following condition (4) is satisfied:

$$-1.2<FL/fG2F<0.5 \quad (4),$$

in which fG2F denotes a focal length of the front lens unit of the second lens unit, and FL denotes a focal length of the image forming optical system.

6. The image forming optical system according to claim 1, wherein the first lens unit comprises a negative lens and a positive lens in order from the object side, and
satisfies the following condition:

$$0.4<\Sigma d/TL<0.8 \quad (5),$$

in which $\Sigma d$ denotes an axial length from the surface of the first lens unit closest to the object side to the surface of the second lens unit closest to the image side, and TL denotes a sum of the axial length $\Sigma d$ and a back focus of the image forming optical system.

7. The image forming optical system according to claim 1, wherein the following condition (6) is satisfied:

$$0.0 \leq dS/TL<0.2 \quad (6),$$

in which TL denotes a sum of an axial length from the surface of the first lens unit closest to the object side to the surface of the second lens unit closest to the image side and a back focus of the image forming optical system, and dS denotes an axial length between the surface of the first lens unit closest to the image side and the surface of the second lens unit closest to the object side.

8. The image forming optical system according to claim 1, wherein the rear lens unit of the second lens unit has an aspherical surface.

9. The image forming optical system according to claim 8, wherein an object-side surface of the rear lens unit of the second lens unit is an aspherical surface.

10. The image forming optical system according to claim 1, wherein the first lens unit consists of, in order from the object side, a negative lens whose concave surface faces the object side, and a positive lens whose convex surface faces the image side, and
the front lens unit of the second lens unit consists of, in order from the object side, a positive lens whose convex surface faces the object side and a negative lens whose concave surface faces the image side.

11. An image pickup apparatus comprising:
the image forming optical system according to claim 1; and
an electronic image sensor which is disposed on the image side of the image forming optical system, the sensor being configured to convert an optical image formed by the image forming optical system into an electric signal.

12. The image pickup apparatus according to claim 11, further comprising:

a low-pass filter disposed along an optical axis between the image forming optical system and the electronic image sensor.

13. An image forming optical system comprising, in order from an object side:
a first lens unit having a positive refractive power;
an aperture stop; and
a second lens unit having a positive refractive power,
the first lens unit being a lens unit which is closest to the object side in the image forming optical system;
the second lens unit being a lens unit which is closest to an image side in the image forming optical system,
the second lens unit comprising, in order from the object side:
a front lens unit in which a surface closest to the image side is a concave surface which faces the image side; and
a rear lens unit which has a positive refractive power and in which a surface closest to the object side is a concave surface which faces the object side,
the rear lens unit consisting of one positive meniscus lens whose convex surface faces the image side,
at least one optical element of the optical system having a refractive index which is larger than 1.9,
the image forming optical system satisfying the following condition (1):

$$-1.0<R2/R3<-0.01 \quad (1),$$

wherein R2 denotes a paraxial radius of curvature of the surface of the front lens unit closest to the image side, and R3 denotes a paraxial radius of curvature of the surface of the rear lens unit on the object side.

14. The image forming optical system according to claim 13, wherein the front lens unit has a negative refractive power.

15. The image forming optical system according to claim 13, wherein the first lens unit has a lens which is arranged closest to the image side therein and is configured to satisfy the following condition (3):

$$n1>1.9 \quad (3),$$

in which n1 denotes a refractive index of the lens of the first lens unit closest to the image side.

16. The image forming optical system according to claim 13, wherein the first lens unit comprises a negative lens and a positive lens in order from the object side, and
the front lens unit of the second lens unit comprises a positive lens and a negative lens in order from the object side.

17. The image forming optical system according to claim 13, wherein the following condition (4) is satisfied:

$$-1.2<FL/fG2F<0.5 \quad (4),$$

in which fG2F denotes a focal length of the front lens unit of the second lens unit, and FL denotes a focal length of the image forming optical system.

18. The image forming optical system according to claim 13, wherein the first lens unit comprises a negative lens and a positive lens in order from the object side, and
satisfies the following condition:

$$0.4<\Sigma d/TL<0.8 \quad (5),$$

in which $\Sigma d$ denotes an axial length from the surface of the first lens unit closest to the object side to the surface of the second lens unit closest to the image side, and TL denotes a sum of the axial length $\Sigma d$ and a back focus of the image forming optical system.

19. The image forming optical system according to claim 13, wherein the following condition (6) is satisfied:

$$0.0 \leq dS/TL < 0.2 \quad (6),$$

in which TL denotes a sum of an axial length from the surface of the first lens unit closest to the object side to the surface of the second lens unit closest to the image side and a back focus of the image forming optical system, and dS denotes an axial length between the surface of the first lens unit closest to the image side and the surface of the second lens unit closest to the object side.

20. The image forming optical system according to claim 13, wherein the rear lens unit of the second lens unit has an aspherical surface.

21. The image forming optical system according to claim 20, wherein an object-side surface of the rear lens unit of the second lens unit is an aspherical surface.

22. The image forming optical system according to claim 13, wherein the first lens unit consists of, in order from the object side, a negative lens whose concave surface faces the object side, and a positive lens whose convex surface faces the image side, and the front lens unit of the second lens unit consists of, in order from the object side, a positive lens whose convex surface faces the object side and a negative lens whose concave surface faces the image side.

23. An image pickup apparatus comprising:

the image forming optical system according to claim 13; and an electronic image sensor which is disposed on the image side of the image forming optical system, the sensor being configured to convert an optical image formed by the image forming optical system into an electric signal.

24. The image pickup apparatus according to claim 23, further comprising:

a low-pass filter disposed along an optical axis between the image forming optical system and the electronic image sensor.

* * * * *